(12) United States Patent
Matsubara et al.

(10) Patent No.: US 7,151,325 B2
(45) Date of Patent: Dec. 19, 2006

(54) REMOTE STARTING CONTROL APPARATUS WITH THEFT DETECTION AND DELETING/REWRITING CAPABILITIES

(75) Inventors: Manabu Matsubara, Hyogo (JP); Minoru Yoshimura, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 444 days.

(21) Appl. No.: 10/766,001

(22) Filed: Jan. 29, 2004

(65) Prior Publication Data

US 2004/0262068 A1    Dec. 30, 2004

(51) Int. Cl.
*B60R 22/00* (2006.01)
*F02P 9/00* (2006.01)
*H02G 3/00* (2006.01)

(52) U.S. Cl. ...................................... 307/10.6

(58) Field of Classification Search ............... 307/10.6; 340/825.6, 426, 426.1, 825.69; 180/287
See application file for complete search history.

(56) References Cited

U.S. PATENT DOCUMENTS 5,912,512 A * 6/1999 Hayashi et al. ............. 307/10.5
5,933,090 A * 8/1999 Christenson ........... 340/825.69

\* cited by examiner

*Primary Examiner*—Chau N. Nguyen
*Assistant Examiner*—Carlos Amaya
(74) *Attorney, Agent, or Firm*—Oliff & Berridge, PLC

(57) ABSTRACT

A remote start control apparatus, which is installed in a vehicle equipped with an immobilizer unit, which obtains a code output when an ignition key is inserted into a key cylinder and permits the starting of an engine when it is determined that the code is a unique vehicle code, and which controls engine start functions upon receiving an instruction from a portable transmitter, includes: an EEPROM for storing a unique vehicle code; a unit for, upon receiving an engine start instruction signal from the portable transmitter, transmitting the code in the EEPROM to the immobilizer; and a unit for, upon receiving a theft occurrence signal from a security unit, deleting the code stored in the EEPROM.

14 Claims, 17 Drawing Sheets

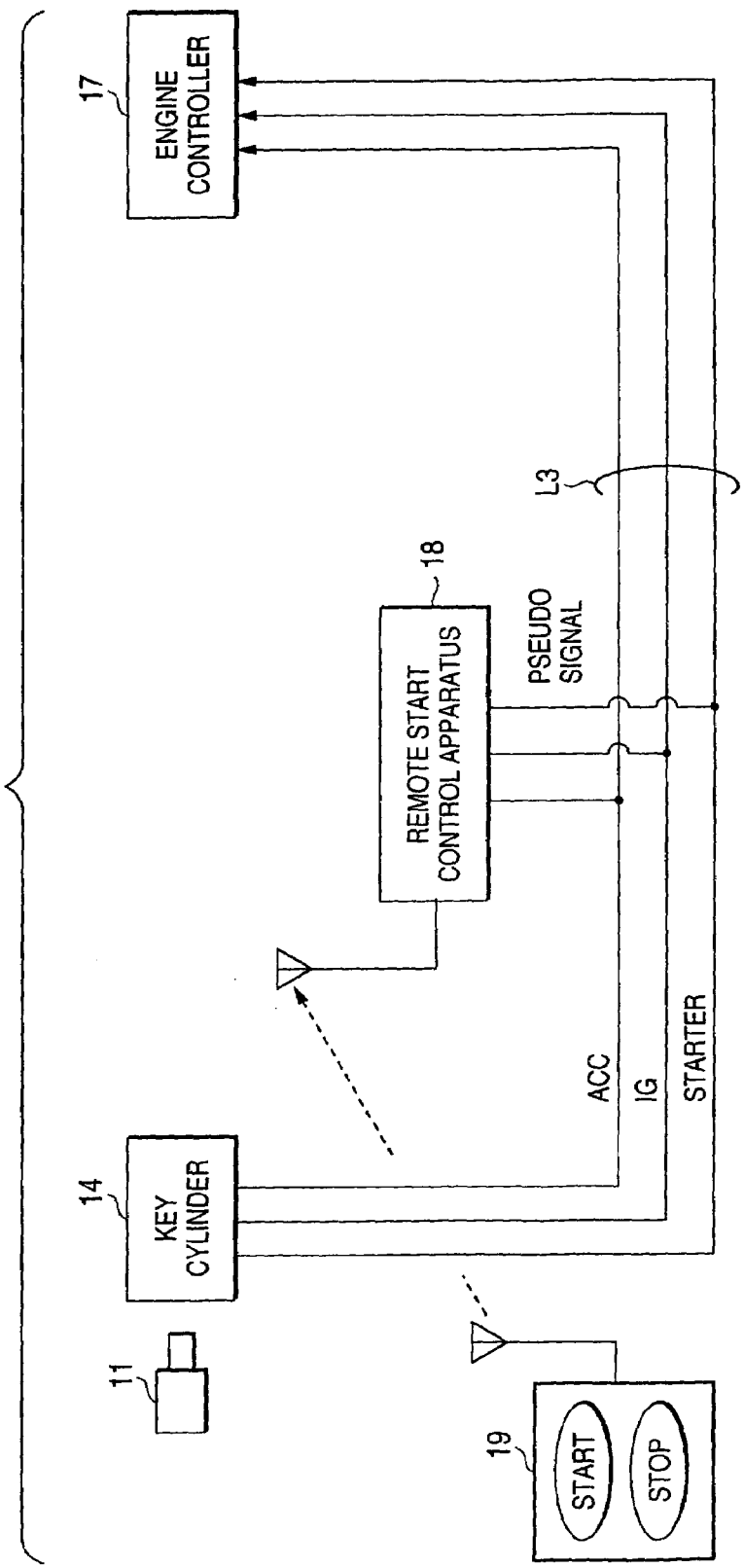

REMOTE STARTING CONTROL APPARATUS WITH THEFT DETECTION AND DELETING/REWRITING CAPABILITIES

BACKGROUND OF THE INVENTION

1. Field of the Invention

The present invention relates to a remote starting control apparatus and a starting control apparatus, and more specifically, to a remote starting control apparatus employed for a vehicle that has an immobilizer function, and to a starting control apparatus that also has an immobilizer function.

2. Description of the Related Art

Recently, the number of vehicles provided with antitheft functions, called immobilizer functions, has increased. As is shown in FIG. 19, providing an immobilizer function for the engine of a vehicle requires an ignition key 1 having a grip portion 2 that includes a chip 2, in which a specific code having a transmission function is stored, and a key cylinder 4; a transponder 5 that is attached to the key cylinder 4; an immobilizer unit 6 that serves as an antitheft device and in which a code unique to the vehicle is stored; and an engine controller 7 for controlling such functions as the starting of the engine.

When a driver inserts the ignition key 1 into the key cylinder 4 (or uses the ignition key 1 to rotate an ignition switch to either the ACC or the IG output position), a key insertion detection signal goes High, and upon receiving this signal, the immobilizer unit 6 transmits a start signal along a signal line L1 to the transponder 5.

Upon receiving the start signal, the transponder 5 employs a wireless connection to communicate with the chip 3 of the ignition key 1 inserted into the key cylinder 4, and obtains the specific code stored in the chip 3. Then, the transponder 5 transmits the specific code, together with a clock signal, along a signal line L2 to the immobilizer unit 6.

The immobilizer unit 6 then determines whether the specific code received from the transponder 5 matches a previously stored unique vehicle code. When these codes match, the immobilizer unit 6 assumes that the driver who inserted the ignition key 1 into the key cylinder 4 is an authorized driver, and transmits an engine start permission signal to the engine controller 7.

When the engine controller 7 receives the start permission signal, and thereafter receives the start signal from the key cylinder 4, it performs engine control processes, such as a fuel supply process and an ignition time setting process. However, when the engine controller 7 receives the start signal, but does not receive the start permission signal, it disregards the start signal and takes no further action.

As is described above, the engine can not be started unless the code stored in the chip 3 of the ignition key 1 is the unique vehicle code. Therefore, the direct connection of an illegal ignition key or ignition switch disables the engine startup process and prevents the theft of the vehicle.

Remote start control apparatuses for starting machinery, such as engines, are also in practical use today. As is shown in FIG. 20, when a remote start control apparatus 18 receives an engine start instruction signal from a portable transmitter 19 carried by a driver, the remote start control apparatus 18 outputs to an engine controller 17, along an ignition switch signal line L3, pseudo signals for an ACC signal, an IG signal and a start signal that are output when an authorized ignition key 11 is used to turn a switch to a starter output position.

As a result, an engine can be started when only an engine start instruction signal is transmitted by the portable transmitter 19, and in this case, the ignition key 11 need not be inserted into the key cylinder 14 and turned.

However, when a vehicle having the immobilizer function is to be additionally equipped with a remote start control apparatus 18, the unique vehicle code stored in the immobilizer unit 6 must be matched, i.e., the authorized ignition key 1 must be inserted into the key cylinder 4. Therefore, even when the pseudo signals for the ACC signal, the IG signal and the starter signal are transmitted to the engine controller 7, the engine can not be started.

To resolve this problem, an alternate technique is disclosed in JP-A-10-176642 (conventional example 1). According to this technique, a unique vehicle code is stored in a remote start control apparatus, and when the remote start control apparatus receives and transmits an engine start instruction, it also transmits the unique vehicle code to an immobilizer unit. Thereafter, the immobilizer unit transmits a start permission signal to an engine controller.

However, with the technique disclosed in conventional example 1, if a thief were to break into a vehicle and steal the remote start control apparatus, the thief could analyze the data stored in the apparatus and identify the unique vehicle code. Then, were the unique vehicle code obtained in this manner, the ignition key (i.e., the authorized ignition key) in which the code is stored could be copied, and stealing the vehicle would be easy.

SUMMERY OF THE INVENTION

To resolve this shortcoming, it is one objective of the present invention to provide a remote start control apparatus and a start control apparatus that can prevent the theft of a vehicle, even after the remote start control apparatus for the vehicle has itself been stolen.

To achieve this objective, according to a remote start control apparatus (1), which is installed in a vehicle equipped with a start control apparatus, for fetching a predetermined code that is output based on a predetermined operation, for determining whether the predetermined code is a code unique to a vehicle and for, when the codes match, permitting the starting of machinery, such as an engine, and which starts the machinery in accordance with an instruction signal received from a transmitter, includes: a first storage unit for storing the code unique to the vehicle; a first supply unit for, upon receiving from the transmitter a start instruction signal for the machinery, supplying the code stored in the first storage unit to the start control apparatus; and a first memory control unit for, when a determination is made, based on a specific signal received from a theft detection unit for detecting a vehicle theft and another signal equivalent to the specific signal, that the vehicle has been stolen, either deleting the code stored in the first storage unit or rewriting the code.

According to the remote start control apparatus (1), when a machinery (e.g, the engine) start instruction signal is received from the transmitter, the code stored in the first storage unit is transmitted to the start control apparatus (e.g., an immobilizer unit). Therefore, even when, using the transmitter, the engine start instruction is issued by remote control, a specific code is supplied to the start control apparatus in the same manner as when a predetermined operation, such as the insertion of an authorized ignition key into a key cylinder, is performed.

Therefore, since the unique vehicle code is stored in the first storage unit, when the machinery start instruction is received from the transmitter, the unique vehicle code can also be supplied to the start control apparatus, and the start control apparatus can then permit the machinery to be started. Therefore, the engine can be started by a remote operation, without the authorized ignition key having to be inserted into the key cylinder and turned.

Furthermore, according to the remote start control apparatus (1), when based on the signal received by the theft detection unit for detecting the theft of a vehicle, or another, equivalent signal (e.g., a signal that is not directly received from the theft detection unit, but is indirectly received through another device), a determination is made that the vehicle has been stolen, the code stored in the first storage unit is deleted or rewritten.

Therefore, even when a thief breaks into the vehicle and steals the remote start control apparatus and the data stored in this apparatus are analyzed, the code unique to the vehicle is deleted or rewritten. Therefore, the unique vehicle code can not be obtained by the thief. And thus, the ignition key in which the code unique to the vehicle is stored can be prevented from being copied, so that even if the remote start control apparatus itself is stolen, a theft of the vehicle can be prevented.

Further, a remote start control apparatus (2), which is installed in a vehicle equipped with a start control apparatus, for fetching a predetermined code that is output based on a predetermined operation, for determining whether the predetermined code is a code unique to a vehicle and for, when the codes match, permitting the starting of machinery, such as an engine, and which starts the machinery in accordance with an instruction signal received from a transmitter, includes: a first storage unit for storing the code unique to the vehicle; a first supply unit for, upon receiving from the transmitter a start instruction signal for the machinery, supplying the code stored in the first storage unit to the start control apparatus; and a second memory control unit for, when the disconnection of a battery mounted in the vehicle is detected, deleting or rewriting the code stored in the first storage unit.

According to the remote start control apparatus (2), when a machinery (e.g, the engine) start instruction signal is received from the transmitter, the code stored in the first storage unit is transmitted to the start control apparatus (e.g., an immobilizer unit). Therefore, even when, using the transmitter, the engine start instruction is issued by remote control, a specific code is supplied to the start control apparatus in the same manner as when a predetermined operation, such as the insertion of an authorized ignition key into a key cylinder, is performed.

Therefore, since the unique vehicle code is stored in the first storage unit, when the machinery start instruction is received from the transmitter, the unique vehicle code can also be supplied to the start control apparatus, and the start control apparatus can then permit the machinery to be started. Therefore, the engine can be started by a remote operation, without the authorized ignition key having to be inserted into the key cylinder and turned.

In addition, according to the remote start control apparatus (2), when the battery is disconnected (e.g., when a thief breaks into a vehicle and steals the remote start control apparatus, and the remote start control apparatus is disconnected from the battery), the code (the unique vehicle code) stored in the first storage unit is deleted or rewritten.

Therefore, even when a thief breaks into the vehicle and steals the remote start control apparatus and the data stored in this apparatus are analyzed, the code unique to the vehicle is deleted or rewritten. Therefore, the unique vehicle code can not be obtained by the thief. And thus, the ignition key in which the code unique to the vehicle is stored can be prevented from being copied, so that even if the remote start control apparatus itself is stolen, the theft of the vehicle can be prevented.

Further, a remote start control apparatus (3), which is installed in a vehicle equipped with a start control apparatus, for fetching a predetermined code that is output based on a predetermined operation, for determining whether the predetermined code is a code unique to a vehicle and for, when the codes match, permitting the starting of machinery, such as an engine, and which starts the machinery in accordance with an instruction signal received from a transmitter, includes: a first storage unit for storing the code unique to the vehicle; a first supply unit for, upon receiving from the transmitter a start instruction signal for the machinery, supplying the code stored in the first storage unit to the start control apparatus; a second storage unit for storing a remote control ID code used for a remote operation; and a third memory control unit for, when it is determined that a remote control ID code has been registered in the second storage unit, deleting or rewriting the code stored in the first storage unit.

The remote start control apparatus must naturally obey an instruction issued by an authorized driver, but must not obey an instruction issued by another driver. Therefore, a remote control ID code that is used in common is registered in advance in the remote start control apparatus and a transmitter owned by the authorized driver.

For the registration of the remote control ID code used in common by the two devices, a method is available for registering, with the remote start control apparatus, a remote control ID code stored in the transmitter. This method is especially effective for changing the remote control ID code, or additionally registering the ID code.

While this method is effective for a registration change, or for an additional registration, a remote control ID code stored in a transmitter owned by a criminal can also be registered. And if a remote control ID code stored in the transmitter of a criminal is registered in the remote start control apparatus, the criminal will be permitted to freely perform a remote control operation.

According to the remote start control apparatus (3), when a start instruction signal for machinery (e.g., the engine) is received from the transmitter, the code stored in the first storage unit is supplied to the start control apparatus (e.g., the immobilizer unit). Therefore, when as part of a remote operation a start instruction for machinery is issued using the transmitter, a specific code is supplied to the start control apparatus in the same manner as when a predetermined operation (e.g., the insertion into the key cylinder of an authorized ignition key) is performed.

Therefore, when the code unique to a vehicle is stored in the first storage unit, this code can be supplied to the start control apparatus when a machinery start instruction is received from the transmitter, and permission to start the machinery can be provided by the start control apparatus. As a result, the remote operation can be used to start the engine, without the authorized ignition key being inserted into the key cylinder and turned.

Furthermore, according to the remote start control apparatus (3), when it is determined that the code is registered in the second storage unit, e.g., the remote control ID code is changed, or is additionally registered, the code (the unique vehicle code) stored in the first storage unit is deleted or rewritten.

With this configuration, even when the remote control ID code stored in the transmitter of the criminal is registered in the second storage unit, and the criminal can freely issue an engine start instruction to the remote start control apparatus, the remote start control apparatus will not supply the unique vehicle code to the start control apparatus (e.g., the immobilizer unit). And as a result, a remote operation, such as an engine start operation, initiated by the criminal will not be accepted.

According to a remote start control apparatus (4), when for the remote start control apparatus (3) it is determined that a code has been registered in the second storage unit, while a first predetermined condition, such as the theft of the vehicle, has been established, the third memory control unit deletes or rewrites the code stored in the first storage unit.

In the remote start control apparatus (3), when it is determined that the code (remote control ID code) is registered in the second storage unit, the code (the unique vehicle code) stored in the first storage unit is deleted or rewritten in order to prevent the registration, with the second storage unit, of the remote control ID code that is stored in the transmitter of the criminal.

However, according to this method, when the authorized driver registers the code (the remote control ID code), the code (the unique vehicle code) stored in the first storage unit is deleted. Thus, the unique vehicle code must be re-registered, and the usability is not satisfactory.

Therefore, according to the remote start control apparatus (4), when the code is registered in the second storage unit while the first predetermined condition (e.g., the theft is detected by the theft detection unit for detecting the occurrence of a theft, and an urgent mode is entered) is established, the code (the unique vehicle code) stored in the first storage unit is deleted or rewritten.

Therefore, when the authorized driver registers the code, the deleting or the rewriting of the code stored in the first storage unit can be avoided, so that a satisfactory usability can be provided.

According to a remote start control apparatus (5), the remote start control apparatus of one of (1) to (4) further includes: a fourth memory control unit for, when a second predetermined condition is established, storing in the first storage unit the predetermined code that is output through the predetermined operation.

For the remote start control apparatus of one of (1) to (4), the code (the unique vehicle code) stored in the first storage unit is deleted or rewritten. However, when the authorized driver performs a remote operation after the code has been deleted or rewritten, the driver must re-register the code unique to the vehicle.

According to the remote start control apparatus (5), when the second predetermined condition (e.g., a theft has occurred, and the code stored in the first storage unit has been deleted or rewritten) is established, the predetermined code (the unique vehicle code) that is output through the predetermined operation (e.g., storing the unique vehicle code and inserting, into the key cylinder, the ignition key that incorporates, in the grip portion, the chip having a transmission function) is automatically stored in the first storage unit. Therefore, without any action being required of the user, the code unique to the vehicle can be re-registered.

According to a remote start control apparatus (6), the remote start control apparatus (5) further includes: a determination unit for determining whether the predetermined code output through the predetermined operation is an appropriate code for storage in the first storage unit, wherein, when the determination unit determines that the predetermined code is an appropriate code for storage in the first storage unit, the fourth memory control unit stores the predetermined code in the first storage unit.

For the remote start control apparatus (5), the predetermined code output through the predetermined operation (e.g., the storage of the predetermined code and the insertion into the key cylinder of the ignition key that incorporates, in the grip portion, the chip having a transmission function) is stored in the first storage unit. When the ignition key inserted into the key cylinder is not an authorized one, a wrong code (i.e., not the unique vehicle code) is stored in the first storage unit, so that machinery, such as the engine, can not be started by the remote operation.

However, according to the remote start control apparatus (6), only when it is determined that the predetermined code output through the predetermined operation is an appropriate code for storage in the first storage unit, is the predetermined code stored in the first storage unit. Therefore, the storage of an incorrect code can be prevented.

According to a remote start control apparatus (7), for the remote start control apparatus (6), the determination unit employs the state of the machinery to perform a determination.

For the remote start control apparatus (7), the state of the machinery (e.g., the engine) is employed to determine whether the predetermined code, which is output through the predetermined operation (e.g., the storage of the predetermined code and the insertion into the key cylinder of the ignition key that incorporates, in the grip portion, the chip having a transmission function), is an appropriate code for storage in the first storage unit.

The engine is started by inserting the authorized ignition key into the key cylinder and turning the ignition key to a starter output position. That is, it can be assumed that the code output through the operation that enables the starting of the engine is the code unique to the vehicle, i.e., the appropriate code for storage in the first storage unit. Therefore, when the determination is performed based on the state of the machinery, the accuracy of the determination can be increased.

According to a remote start control apparatus (8), the remote start control apparatus of one of (1) to (7) further includes: a notification unit for issuing a notification that the code stored in the first storage unit has been deleted or rewritten.

According to the remote start control apparatus (8), since the driver is notified that the code (the unique vehicle code) stored in the first storage unit has been deleted or rewritten, the driver understands that the remote operation is disabled and that re-registration of the unique vehicle code is required.

According to a remote start control apparatus (9), for the remote start control apparatus (8), the notification unit issues a notification at a predetermined time, such as when the performance of the predetermined operation is detected.

According to the remote start control apparatus (9), the notification that the code (the unique vehicle code) stored in the first storage unit has been deleted or rewritten is issued when the predetermined operation (e.g., the insertion of the authorized ignition key into the key cylinder) is performed. Therefore, since the authorized driver can receive the notification while near the vehicle, the authorized driver can be notified that the remote operation is disabled, and that the re-registration of the code unique to the vehicle is required.

Further, a remote start control apparatus (10), which is installed in a vehicle that is equipped with a start control apparatus, for fetching a predetermined code that is output based on a predetermined operation and determining whether the predetermined code matches one of a plurality of unique vehicle codes and for, when the predetermined code matches one of the unique vehicle codes, permitting machinery, such as an engine, to be started and starting the machinery in accordance with an instruction signal received from a transmitter, includes: a third storage unit for storing a specific code that matches one of the unique vehicle codes stored in the start control apparatus; a second supply unit for, upon receiving a start instruction signal for the machinery from the transmitter, supplying to the start control apparatus the specific code stored in the third storage unit; and a third supply unit for, when a determination is made, based on a detection signal, or another signal equivalent to the detection signal, received by a detection unit for detecting a vehicle theft, that a vehicle theft has occurred, supplying a delete/rewrite instruction signal to the start control apparatus to initiate the deleting or rewriting of the unique vehicle code that is stored in the start control apparatus and that matches the specific code.

According to the remote start control apparatus (10), when a machinery (e.g, the engine) start instruction signal is received from the transmitter, the code stored in the first storage unit is transmitted to the start control apparatus (e.g., an immobilizer unit). Therefore, even when, using the transmitter, the engine start instruction is issued by remote control, a specific code is supplied to the start control apparatus in the same manner as when a predetermined operation, such as the insertion of an authorized ignition key into a key cylinder, is performed.

Therefore, since a specific code that matches one of the unique vehicle codes stored in the start control apparatus is stored in the third storage unit, when the machinery start instruction is received from the transmitter, the specific code (unique vehicle code) can also be supplied to the start control apparatus, and the start control apparatus can then permit the machinery to be started. Therefore, the engine can be started by a remote operation, without the authorized ignition key having to be inserted into the key cylinder and turned.

Furthermore, according to the remote start control apparatus (10), when the determination is made, based on a detection signal, or another signal equivalent to the detection signal (e.g., a signal not received directly by the theft detection unit, but indirectly, through another device), received by the theft detection unit for detecting a vehicle theft, a delete/rewrite instruction signal is transmitted to the start control apparatus to initiate the deleting or rewriting of the unique vehicle code that is stored in the start control apparatus and that matches the specific code.

With the configuration wherein, upon receiving a delete/rewrite instruction signal the start control apparatus deletes or rewrites the unique vehicle code that matches the specific code when the vehicle theft is detected, the unique vehicle code that matches the specific code stored in the start control apparatus can be deleted or rewritten.

Therefore, even when the remote start control apparatus is stolen by the thief who broke into the vehicle and the thief obtains the specific code by analyzing the data stored in this apparatus, the specific code becomes meaningless once the theft has occurred. Therefore, even when the remote start control apparatus itself is stolen, greater damage, such as the theft of the vehicle, can be prevented.

Further, a remote start control apparatus (11), which is installed in a vehicle that is equipped with a start control apparatus, for fetching a predetermined code that is output based on a predetermined operation and determining whether the predetermined code matches one of a plurality of unique vehicle codes and for, when the predetermined code matches one of the unique vehicle codes, permitting machinery, such as an engine, to be started and starting the machinery in accordance with an instruction signal received from a transmitter, includes: a third storage unit for storing a specific code that matches one of the unique vehicle codes stored in the start control apparatus; a second supply unit for, upon receiving a start instruction signal for the machinery from the transmitter, supplying to the start control apparatus the specific code stored in the third storage unit; a second storage unit for storing a remote control ID code used for a remote operation; and a fourth supply unit for, when it is determined that a code has been registered in the second storage unit, transmitting a delete/rewrite instruction signal to the start control apparatus to initiate the deleting or rewriting of a unique vehicle code that is stored in the start control apparatus and that matches the specific code.

According to the remote start control apparatus (11), when a machinery (e.g, the engine) start instruction signal is received from the transmitter, the code stored in the first storage unit is transmitted to the start control apparatus (e.g., an immobilizer unit). Therefore, even when, using the transmitter, the engine start instruction is issued by remote control, a specific code is supplied to the start control apparatus in the same manner as when a predetermined operation, such as the insertion of an authorized ignition key into a key cylinder, is performed.

Therefore, since a specific code that matches one of the unique vehicle codes stored in the start control apparatus is stored in the third storage unit, when the machinery start instruction is received from the transmitter, the specific code (unique vehicle code) can also be supplied to the start control apparatus, and the start control apparatus can then permit the machinery to be started. Therefore, the engine can be started by a remote operation, without the authorized ignition key having to be inserted into the key cylinder and turned.

Further, according to the remote start control apparatus (11), when it is determined that the registration of the code in the second storage unit, i.e., a change or an additional registration of the remote control ID code, has been performed, the delete/rewrite instruction signal is transmitted to the start control apparatus to delete or rewrite one of the unique vehicle codes that is stored in the start control apparatus and that matches the specific code.

With the configuration wherein, upon receiving a delete/rewrite instruction signal the start control apparatus deletes or rewrites the unique vehicle code that matches the specific code when the vehicle theft is detected, the unique vehicle code that matches the specific code stored in the start control apparatus can be deleted or rewritten.

Therefore, even when the remote control ID code stored in the transmitter possessed by the criminal is registered in the second storage unit, and the criminal can freely issue an engine start instruction to the remote start control apparatus, a remote operation initiated by the criminal will not be accepted, because by the time the remote control ID code is registered, the unique vehicle code that matches the specific code will already have been removed.

According to a remote start control apparatus (12), for the remote start control apparatus (11), when it is determined that the registration of a code in the second storage unit has been performed, while a first predetermined condition, such as the occurrence of a vehicle theft, has been established, the fourth supply unit transmits the delete/rewrite instruction signal to the start control apparatus.

According to the remote start control apparatus (11), when it is determined that the code (the remote control ID code) has been registered in the second storage unit, the delete/rewrite instruction signal is transmitted to the start control apparatus, and a unique vehicle code that is stored in the start control apparatus and that matches the specific code is deleted or rewritten. Therefore, this configuration can cope with an emergency that arises when the remote control ID code stored in the transmitter of the criminal is registered in the second storage unit.

However, according to this method, when the authorized driver registers the code (the remote control ID code), the unique vehicle code that matches the specific code is deleted. Thus, the unique vehicle code must be re-registered, and the usability is not satisfactory.

Therefore, according to the remote start control apparatus (12), when the code is registered in the second storage unit while the first predetermined condition (e.g., the theft is detected by the theft detection unit for detecting the occurrence of a theft, and an urgent mode is entered) is established, the delete/rewrite instruction signal is supplied to the start control apparatus.

Therefore, when the authorized driver registers the code, the deleting or the rewriting of the unique vehicle code that matches the specific code can be avoided, so that a satisfactory usability can be provided.

Further, a start control apparatus (1), which permits the starting of machinery, such as an engine, when it is determined that one of a plurality of unique vehicle codes stored in a fourth storage unit matches a specific code that is supplied by a remote start control apparatus for starting the machinery in accordance with a predetermined code received through a predetermined operation, or an instruction signal received from a transmitter, includes: a fifth memory controller for, when a determination is made, based on a detection signal received by a theft detection unit for detecting a vehicle theft, or another signal equivalent to the detection signal, that a vehicle theft has occurred, deleting or rewriting one of the unique vehicle codes that is stored in the fourth storage unit and that matches the specific code.

According to the start control apparatus (1), the starting of the machinery (e.g., the engine) can be permitted not only when a predetermined code supplied as a result of a predetermined operation (e.g., the insertion of the authorized ignition key into the key cylinder) matches one of the unique vehicle codes stored in the fourth storage unit, but also when a specific code (e.g., a code supplied as a result of a remote operation) supplied by the remote start control apparatus matches one of the unique vehicle codes stored in the fourth storage unit.

Furthermore, according to the start control apparatus (1), when the determination is made, based on a detection signal, or another signal equivalent to the detection signal (e.g., a signal not received directly by the theft detection unit, but indirectly, through another device), received by the theft detection unit for detecting a vehicle theft, the unique vehicle code that is stored in the fourth storage unit and that matches the specific code is deleted or rewritten.

Therefore, even when the remote start control apparatus is stolen by the thief who broke into the vehicle and the thief obtains the specific code by analyzing the data stored in this apparatus, the specific code becomes meaningless once the theft has occurred. Therefore, even when the remote start control apparatus itself is stolen, greater damage, such as the theft of the vehicle, can be prevented.

Further, a start control apparatus (2), which permits the starting of machinery, such as an engine, when it is determined that one of a plurality of unique vehicle codes stored in a fourth storage unit matches a specific code that is supplied by a remote start control apparatus for starting the machinery in accordance with a predetermined code received through a predetermined operation, or an instruction signal received from a transmitter, includes: a sixth memory control unit for, upon receiving a delete/rewrite instruction signal from the remote start control apparatus to delete or rewrite a unique vehicle code that matches the specific code, deleting or rewriting the unique vehicle code that is stored in the fourth storage unit and that matches the specific code.

According to the start control apparatus (2), the starting of the machinery (e.g., the engine) can be permitted not only when a predetermined code supplied as a result of a predetermined operation (e.g., the insertion of the authorized ignition key into the key cylinder) matches one of the unique vehicle codes stored in the fourth storage unit, but also when a specific code (e.g., a code supplied as a result of a remote operation) supplied by the remote start control apparatus matches one of the unique vehicle codes stored in the fourth storage unit.

According to the start control apparatus (2), upon the reception of the delete/rewrite instruction signal from the remote start control apparatus, a unique vehicle code that is stored in the fourth storage unit and matches the specific code is deleted or rewritten.

With the configuration wherein the delete/rewrite instruction signal is supplied to the start control apparatus by the remote start control apparatus upon the detection of the theft, the unique vehicle code that is stored in the fourth storage unit and that matches the specific code is deleted or rewritten.

Therefore, even when the remote start control apparatus is stolen by the thief who broke into the vehicle and the thief obtains the specific code by analyzing the data stored in this apparatus, the specific code becomes meaningless once the theft has occurred. Therefore, even when the remote start control apparatus itself is stolen, greater damage, such as the theft of the vehicle, can be prevented.

BRIEF DESCRIPTION OF THE DRAWINGS

FIG. 20 is a schematic block diagram showing the essential portion of an engine start system employing a conventional remote start control apparatus.

DETAILED DESCRIPTION OF THE PREFERRED EMBODIMENTS

Figure 1:
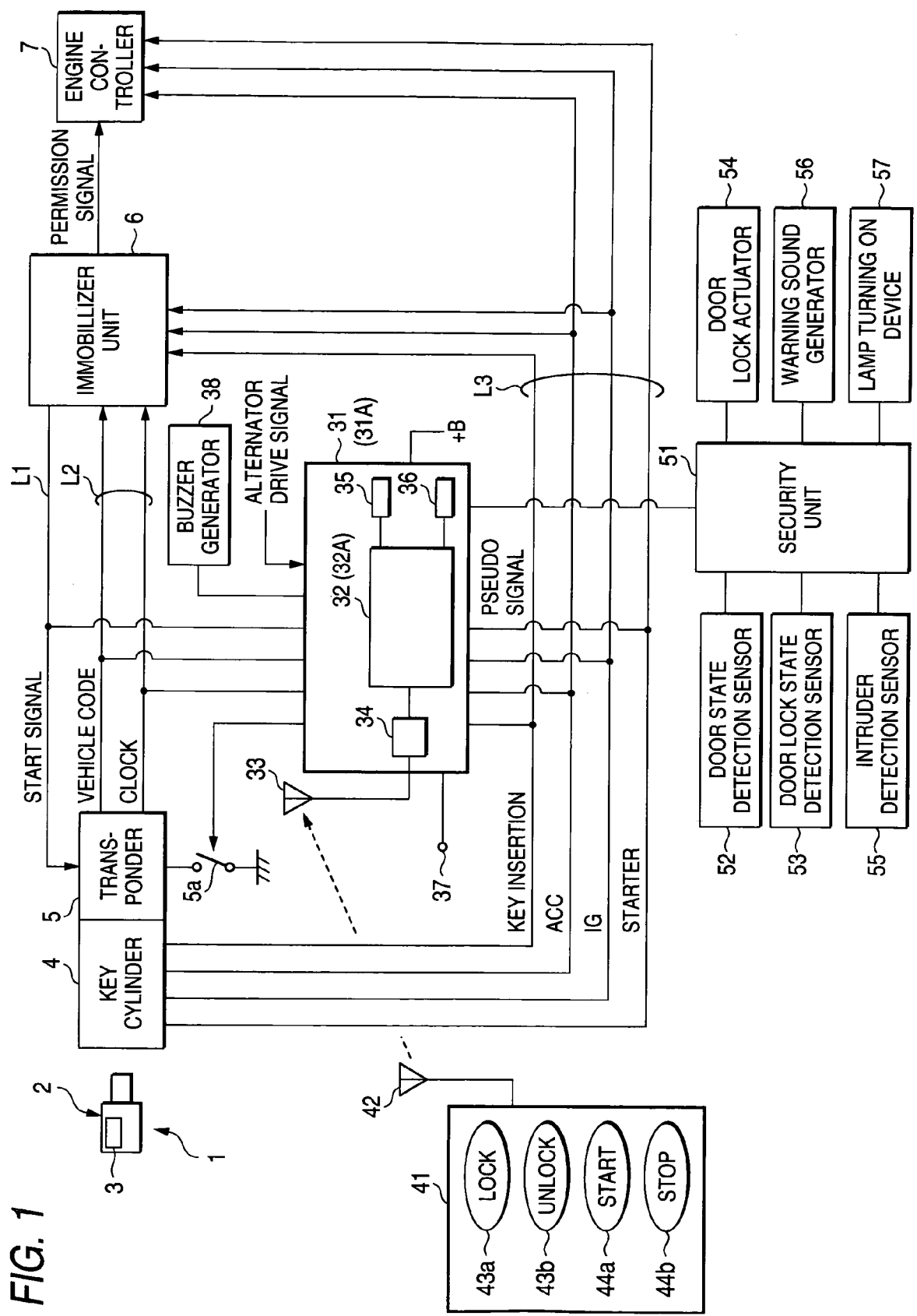
FIG. 1 is a schematic block diagram showing the essential portion of an engine start system employing a remote start control apparatus according to a first embodiment of the present invention.
Figure 19:
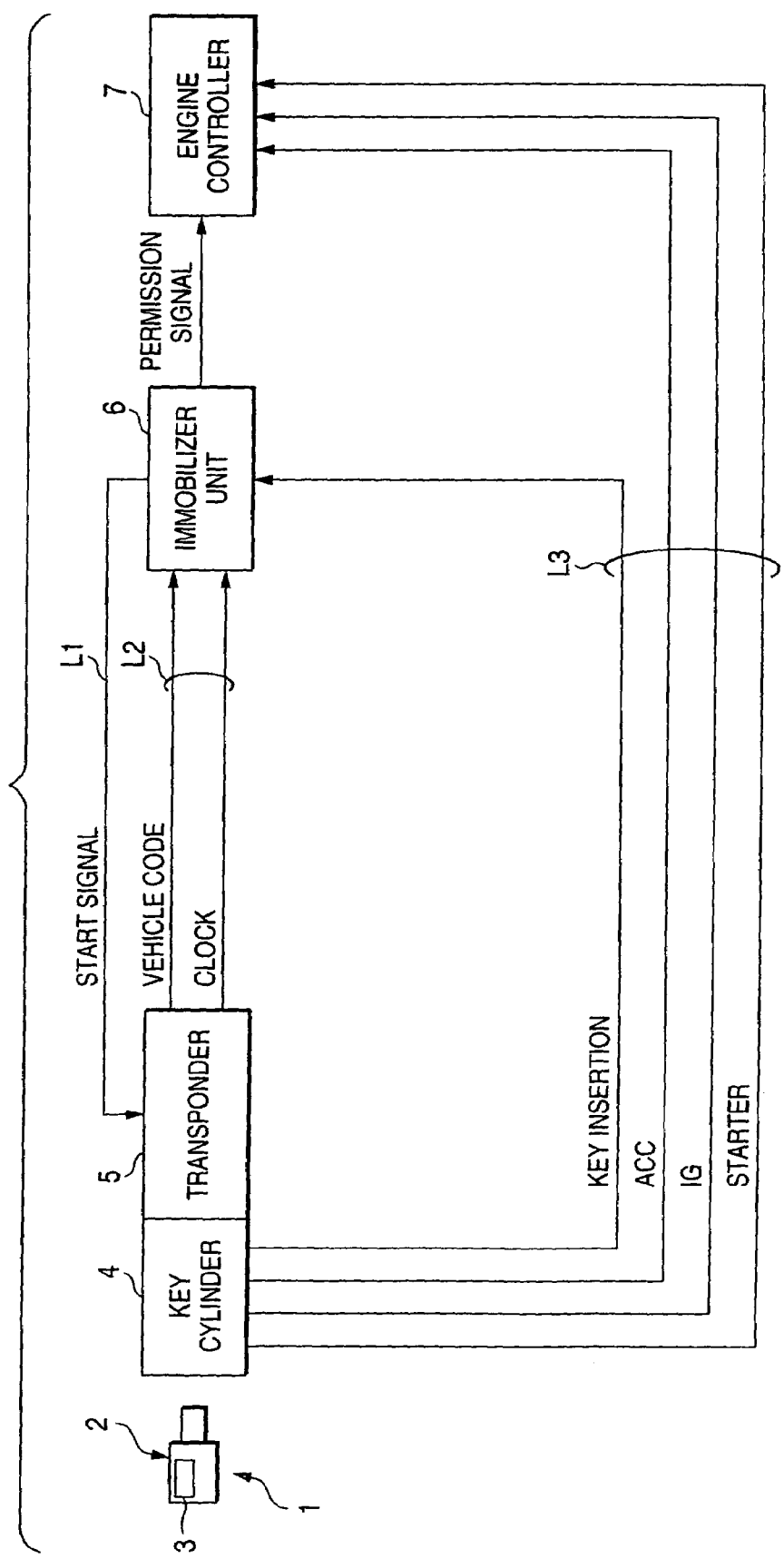
FIG. 19 is a schematic block diagram showing the essential portion of a conventional engine start system.

A remote start control apparatus and a start control apparatus according to the preferred embodiments of the present invention will now be described while referring to the accompanying drawings. FIG. 1 is a schematic block diagram showing the essential portion of an engine start system employing a remote start control apparatus according to a first embodiment of the invention. The same reference numerals as those used for the engine start system in FIG. 19 are employed to denote corresponding components.

The engine start system includes: an ignition key 1, which incorporates, in a grip portion 2, a chip 3 in which a code unique to a vehicle is stored and a transmission function is provided; a key cylinder 4; a transponder 5 attached to the key cylinder 4; an immobilizer unit 6, which stores the code unique to the vehicle and which performs an antitheft function; an engine controller 7 for controlling operations such as the starting of an engine; a remote start control apparatus 31; a portable transmitter 41; and a security unit 51.

The remote start control apparatus 31 includes: a microcomputer 32; an antenna 33 and a reception unit for receiving a signal from the portable transmitter 41; an EEPROM 35 in which a remote control ID code is stored; an EEPROM 36, in which the vehicle unique code is stored; and a program switch used to register the remote control ID code (i.e., to write the remote control ID code in the EEPROM 35).

The remote start control apparatus 31 fetches an alternator drive signal used to determine whether the engine has started; opens or closes a switch 5a connected to the transponder 5; controls a buzzer generator 38 to generate a buzzing sound; or exchanges data with the security unit 51.

The portable transmitter 41 includes: a microcomputer (not shown); an antenna 42 for transmitting a predetermined signal to the remote start control apparatus 31; an EEPROM (not shown) in which the remote control ID code is stored; a switch button 43a used to instruct, using a remote operation, the locking of a door; a switch button 43b used to instruct the unlocking of the door; a switch button 44a used to instruct, using a remote operation, the starting of the engine; and a switch button 44b used to instruct the stopping of the engine.

Upon the depression of the switch button 43a, the microcomputer of the portable transmitter 41 transmits externally, via the antenna 42, a signal that includes the remote control ID code and a door lock instruction code. Upon the depression of the switch button 43b, the microcomputer of the portable transmitter 41 transmits externally, via the antenna 42, a signal that includes the remote control ID code and a door unlock instruction code.

Upon the depression of the switch button 44a, the microcomputer of the portable transmitter 41 transmits externally, via the antenna 42, a signal that includes the remote control ID code and an engine start instruction code. Upon the depression of the switch button 44b, the microcomputer transmits externally, via the antenna 42, a signal that includes the remote control ID code and an engine stop instruction code.

The microcomputer (not shown) of the security unit 51, which can exchange data with the remote start control apparatus 31, is connected to a door state detection sensor 52 for detecting the open or closed state of the door, a door lock state detection sensor 53 for detecting the locked or unlocked state of the door, a door lock actuator 54, an intruder detection sensor 55 for detecting the presence of a person who has broken into a vehicle, a warning sound generator 56 for generating a warning sound, and a lamp turning on device 57 for turning on a hazard lamp.

When a driver inserts the ignition key 1 into the key cylinder 4 (or when the ignition key 1 is rotated to the ACC output position or the IG output position of the ignition switch), a key insertion detection signal goes High, and upon receiving this signal, the immobilizer unit 6 transmits a pulse start signal, requesting a unique vehicle code, along a signal line L1 to the transponder 5.

Upon receiving this start signal, the transponder 5 uses a wireless connection to communicate with the chip 3 of the ignition key 1 inserted into the key cylinder 4, obtains a code stored in the chip 3, and transmits the code together with a clock signal to the immobilizer unit 6 along a signal line L2.

The immobilizer unit 6 determines whether the code received from the transponder 5 matches a unique vehicle code stored in advance in the immobilizer unit 6. When these two codes match, i.e., an authorized ignition key 1 is inserted into the key cylinder 4, the immobilizer unit 6 transmits to the engine controller 7 a permission signal for the starting of the engine.

When the code received from the transponder 5 does not match the unique vehicle code, after a period of time has elapsed, the immobilizer unit 6 again transmits the start signal to the transponder 5. This operation is repeated until the two codes match (the maximum number of repetition times is limited).

When the engine controller 7 receives the permission signal, and thereafter a start signal from the key cylinder 4, it performs engine control processes, such as a fuel supply process and an ignition time setting process. But when the engine controller 7 receives the starter signal but not the permission signal, it performs no engine control process.

As is described above, the starting of the engine is inhibited unless the code stored in the chip 3 of the ignition key 1 matches the unique vehicle code stored in the immobilizer unit 6. Therefore, the starting of the engine is disabled by a direct connection to an unauthorized ignition key or ignition switch, and the theft of the vehicle can be prevented. In this configuration, the remote start control apparatus 31 is connected to the signal lines L1 to L3, across which it can transmit or receive various signals.

Figure 2:
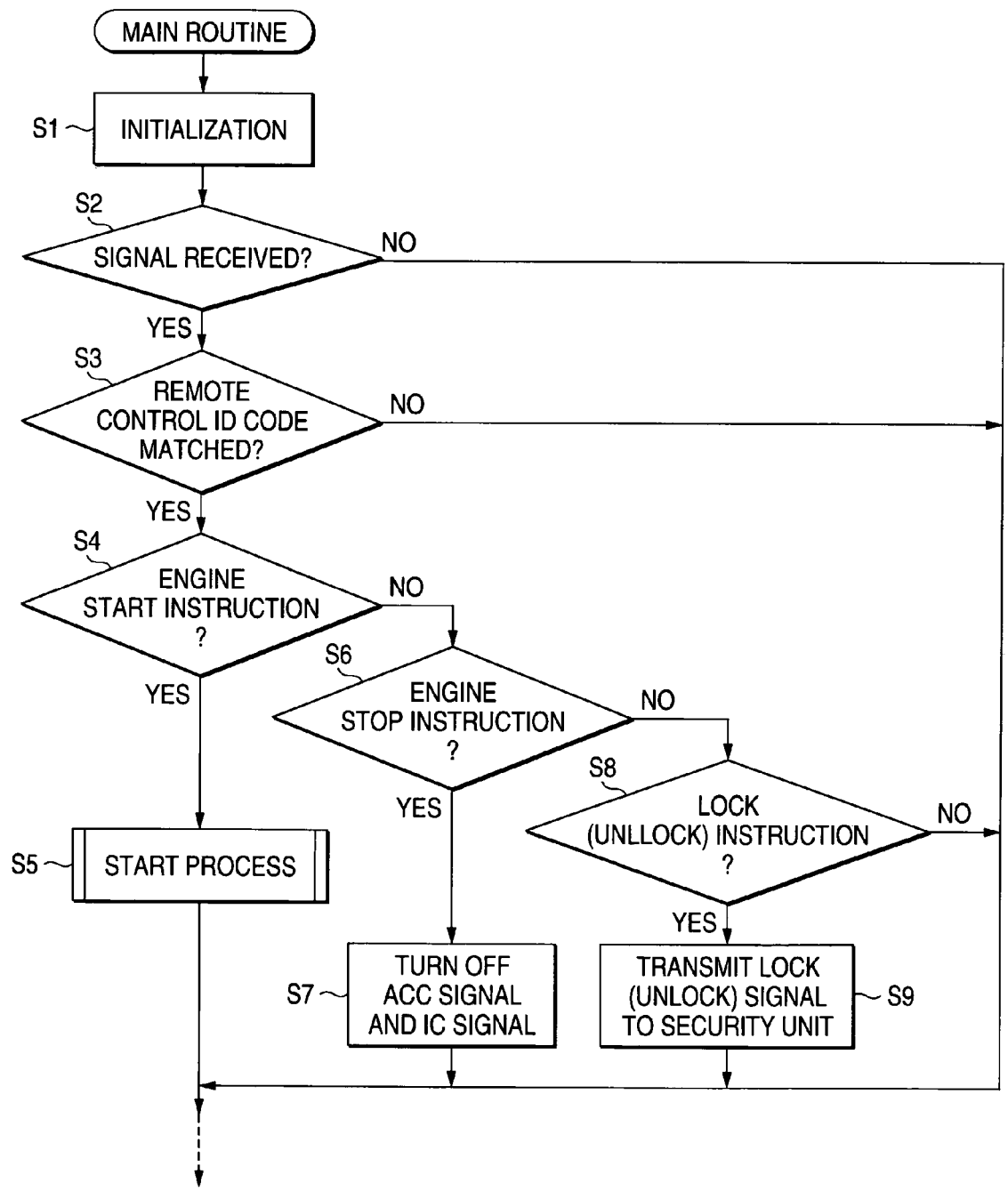
FIG. 2 is a flowchart showing the processing performed by a microcomputer in the remote start control apparatus according to the first embodiment.

While referring to the flowchart in FIG. 2, an explanation will be given for the processing (1)-1 (a main routine) performed by the microcomputer 32 of the remote start control apparatus 31 according to the first embodiment. First, a flag and a counter are initialized, cleared (step S1), and a check is performed to determine whether a signal has been received via the antenna 33 and the reception unit 34 (step S2). When it is determined that a signal has been received, a check is performed to determine whether an ID code included in the received signal matches a remote control ID code stored in the EEPROM 35 (step S3).

When it is determined that the ID code included in the received signal matches the remote control ID code (i.e., a signal is received from the portable transmitter 41 carried by the authorized driver), a check is performed to determine whether the received signal includes an engine start instruction code (step S4). When it is determined that the signal includes an engine start instruction code, program control advances to step S5 and the process for starting the engine is performed (see FIG. 3 for the details). Thereafter, program control is shifted to the next processing.

When it is determined that the received signal does not include an engine start instruction code, a check is performed to determine whether the signal includes an engine stop instruction code (step S6). When it is determined that the signal includes an engine stop instruction code, the engine stop process for setting the key insertion signal, the ACC signal and the IG signal to the OFF state is performed to stop the engine (step S7).

When it is determined at step S6 that the signal does not includes an engine stop instruction code, a check is performed to determine whether the signal includes a door lock (or unlock) instruction code (step S8). When it is determined that the signal is a door lock (or unlock) signal, a signal instructing the locking (or the unlocking) of the door is transmitted to the security unit 51 (step S9).

When it is determined that the signal received from the portable transmitter 41 does not include engine start or engine stop and door lock or door unlock instruction codes, program control is shifted to the next processing. The processing performed when the security unit 51 receives a signal instructing the locking (or unlocking) of the door will be described later in detail while referring to the flowchart in FIG. 5.

When it is determined at step S2 that no signal has been received, or at step S3 that a signal is received but is not from the portable transmitter 41 carried by the authorized driver, neither the engine start or engine stop process need be performed, and program control is shifted to the next processing.

Figure 3:
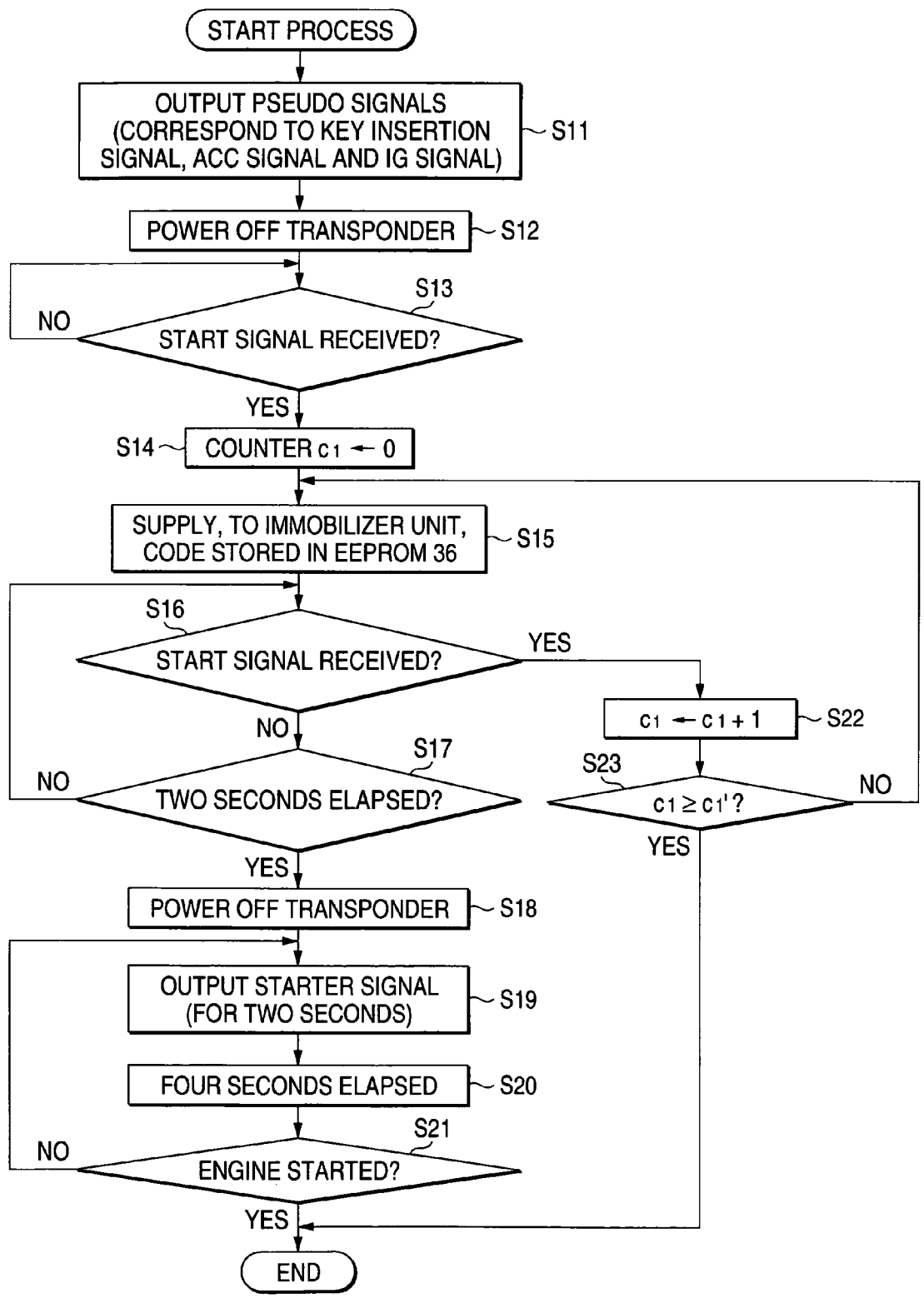
FIG. 3 is a flowchart showing the processing performed by the microcomputer in the remote start control apparatus according to the first embodiment.

Next, while referring to the flowchart in FIG. 3, an explanation will be given for the processing (1)-1a (the engine start process at step S5 in FIG. 2) performed by the microcomputer 32 of the remote start control apparatus 31 according to the first embodiment. It should be noted that the processing (1)-1a is performed when the engine start is instructed by manipulating the portable transmitter 41.

First, pseudo signals, which correspond to the key insertion detection signal, the ACC signal and the IG signal that are output when the authorized ignition key is rotated to the IG signal output position, are supplied to the signal line L3 of the ignition switch and are transmitted to the immobilizer unit 6 to activate it (step S11). Then, the switch 5a is opened to disconnect the power supply from the transponder 5 and inhibit its operation (step S12).

Then, a check is performed to determine whether a start signal has been received from the immobilizer unit 6 (step S13). When it is determined that the start signal has not been received, program control returns to step S13, where the reception of the start signal is waited for. When it is determined that the start signal has been received, the value of a counter $c_1$ is set to 0 (step S14), and a code stored in the EEPROM 36 is transmitted along the signal line L2 to the immobilizer unit 6 (step S15). Thereafter, a check is performed to determine, within a predetermined period (e.g., two seconds), whether the start signal has again been received from the immobilizer unit 6 (steps S16 and S17). Ordinarily, the start signal is transmitted to the transponder 5; however, in this case, since the operation of the transponder 5 has been inhibited, a special problem occurs.

Upon receiving the code along the signal line L2, the immobilizer unit 6 determines whether the received code (i.e., the code stored in the EEPROM 36) matches the unique vehicle code that was registered in advance. When it is determined that these two codes match, the immobilizer unit 6 transmits a permission signal to the engine controller 7 for the starting of the engine, and does not re-transmit the start signal. When it is determined that the received code does not match the unique vehicle code, the immobilizer unit 6 re-transmits the start signal.

Therefore, when the start signal is not again received within two seconds following the transmission of the code stored in the EEPROM 36, it means that the code stored in the EEPROM 36 matches the unique vehicle code, and the immobilizer unit 6 transmits the permission signal to the engine controller 7.

When the start signal is received within two seconds following the transmission of the code stored in the EEPROM 36, it means that a code matching the unique vehicle code is not present in the EEPROM 36, or that (even when a code matching the unique vehicle code has already been registered in the EEPROM 36), because of noise, the immobilizer unit 6 determines that the code stored in the EEPROM 36 does not match the unique vehicle code.

When it is determined at steps S16 and S17 that the start signal has not been received from the immobilizer unit 6 within two seconds (i.e., the code stored in the EEPROM 36 matches the unique vehicle code, and the permission signal is transmitted from the immobilizer unit 6 to the engine controller 7), the switch 5a is closed to supply power to the transponder 5 (step S18).

Following this, a pseudo signal, which corresponds to a starter signal output when the ignition key 1 is turned to the starter output position, is continuously supplied to the signal line L3 of the ignition key for a predetermined period (e.g., two seconds), and is transmitted to the engine controller 7.

Thereafter, following the elapse of a predetermined waiting period (e.g., four seconds) (step S20), an alternator drive signal is employed to determine whether the engine has started (step S21). When it is determined that the engine has started, the processing (1)-1$a$ is terminated. When it is determined that the engine has not started, program control returns to step S19, and the pseudo signal corresponding to the starter signal is again transmitted to the engine controller 7.

When it is determined at step s16 that the start signal has again been received from the immobilizer unit 6, it is assumed that the same code as the unique vehicle code has not been received by the immobilizer unit 6, and the value in the counter $c_1$ is incremented by one (step S22). Then, a check is performed to determine whether the updated value of the counter $c_1$ is equal to or greater than a predetermined value $c_1'$ (e.g., ten) (step S23).

When it is determined that the value of the counter $c_1$ is smaller than the predetermined value $c_1'$, program control returns to step S15 and the code stored in the EEPROM 36 is again transmitted to the immobilizer unit 6. When it is determined that the value of the counter $c_1$ is equal to or greater than the predetermined value $c_1'$, i.e., it is determined that the matching, by the immobilizer unit 6, of the code stored in the EEPROM 36 was not successful, even though the code transmission was repeated $c_1'$ times, it is assumed that the unique vehicle code was not registered in the EEPROM 36, or that the code was not normally received by the immobilizer unit 6 due to noise. The processing (1)-1$a$ is thereafter terminated.

Figure 4:
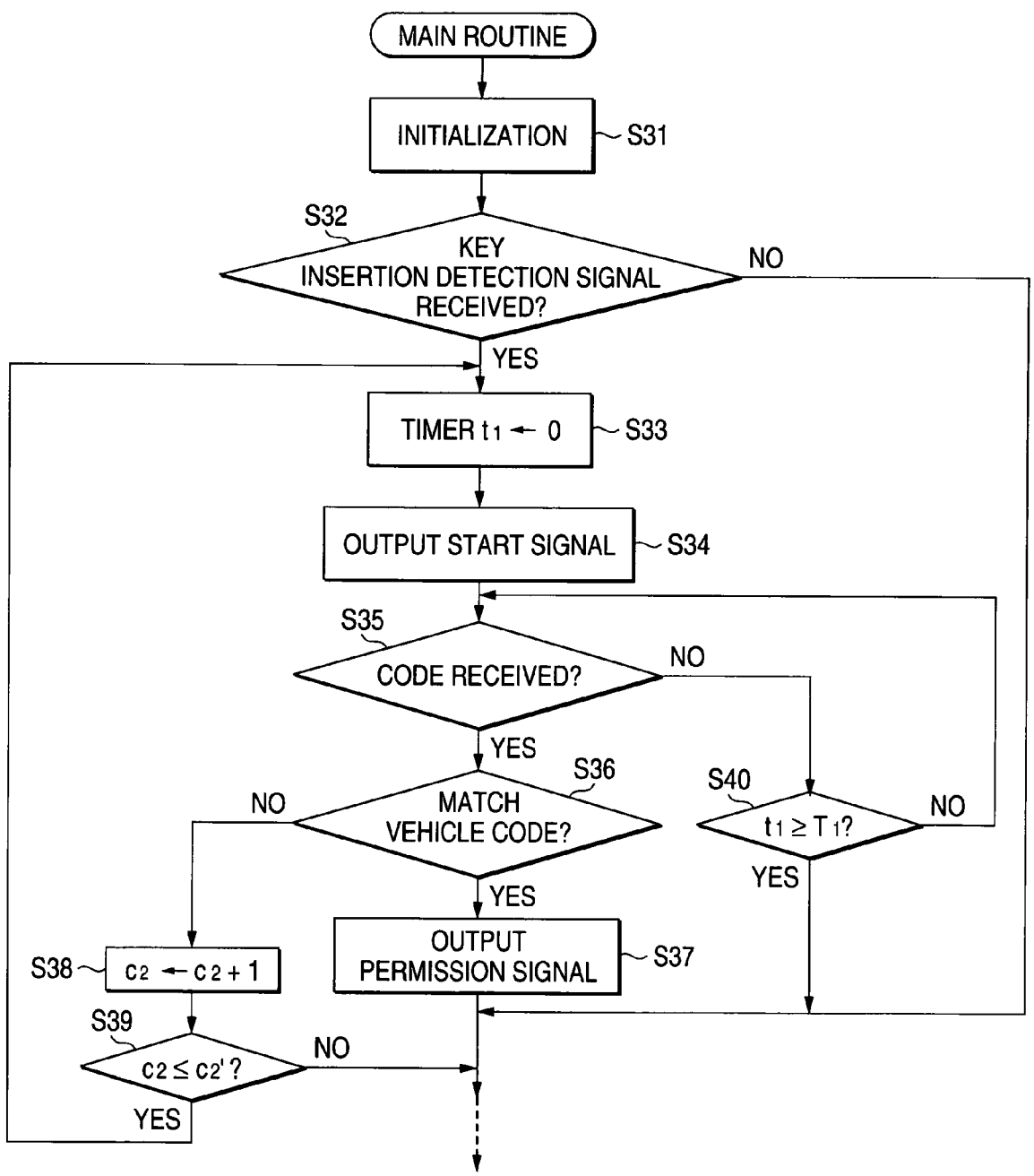
FIG. 4 is a flowchart showing the processing performed by a microcomputer in an immobilizer unit.

Next, the processing (2) (a main routine) performed by the microcomputer of the immobilizer unit 6 will be explained while referring to the flowchart in FIG. 4. First, a flag and a counter are initialized, cleared (step S31), and a check is performed to determine whether the key insertion detection signal has been received from the key cylinder 4, or a pseudo signal corresponding to the key insertion signal has been received from the remote start control apparatus 31 (step S32). It should be noted that, since the immobilizer unit 6 can not distinguish the key insertion detection signal from the pseudo signal, the immobilizer unit 6 performs the same process upon receiving the pseudo signal it performs upon receiving the key insertion detection signal.

When it is determined that the key insertion detection signal, or the pseudo signal, has been received, a timer $t_1$ is set to 0 and started (step S33), and a pulse start signal, supplied to the signal line L1, is transmitted to the transponder 5 and/or the remote start control apparatus 31 (step S34). When it is determined that neither the key insertion detection signal nor the pseudo signal has been received, the processing (2) is terminated.

Upon receiving the start signal, the transponder 5 uses a wireless connection to communicate with the chip 3 of the ignition key 1 inserted into the key cylinder 4, and obtains a code stored in the chip 3 and transmits the code, together with a clock signal, to the immobilizer unit 6 along the signal line L2. Likewise, when the remote start control apparatus 31 receives the start signal after transmitting the pseudo signal, the remote start control apparatus 31 transmits the code stored in the EEPROM 36, together with a clock signal, to the immobilizer unit 6 along the signal line L2 (see step S15 in FIG. 3).

After the start signal is transmitted at step S34, a check is performed to determine whether the code has been received from the transponder 5, or whether the code has been received from the remote start control apparatus 31 (step S35). When it is determined that either code has been received, a check is performed to determine whether the received code matches the unique vehicle code stored in advance (step S36).

When it is determined that the received code matches the unique vehicle code, i.e., that the authorized ignition key 1 has been inserted into the key cylinder 4 or the engine start instruction has been issued by an authorized portable transmitter 4 when performing a remote operation, the permission signal is transmitted to the engine controller 7 for the starting of the engine (step S37). When it is determined that the two codes do not match, the value of a counter $c_2$, which represents the number of times the two codes differed, is incremented by one (step S38), and a check is performed to determine whether the updated value of the counter $c_2$ is equal to or smaller than a predetermined value $c_2'$ (e.g., ten) (step S39).

When it is determined that the value of the counter $c_2$ is equal to or smaller than the predetermined value $c_2'$, i.e., the number of times the codes differed is ten or less, program control returns to step S33 whereat the timer $t_1$ is reset to 0, and the start signal is again supplied to the signal line L1. When the value of the counter $c_2$ is greater than the predetermined value $c_2$, i.e., the number of code disagreement times exceeds ten, it is determined that the received code is not the unique vehicle code, and the processing (2) is terminated.

When it is determined at step S35 that the code has not been received, a check is performed to determine whether, according to the timer $t_1$, a predetermined time period $T_1$ (e.g., one second) has elapsed (step S38). When it is determined, according to the timer $t_1$, that the predetermined period $T_1$ has elapsed, the processing (2) is terminated. But when it is determined, according to the timer $t_1$, that the predetermined period $T_1$ has not yet elapsed, program control returns to step S35, where the reception of the code is waited for.

Figure 5:
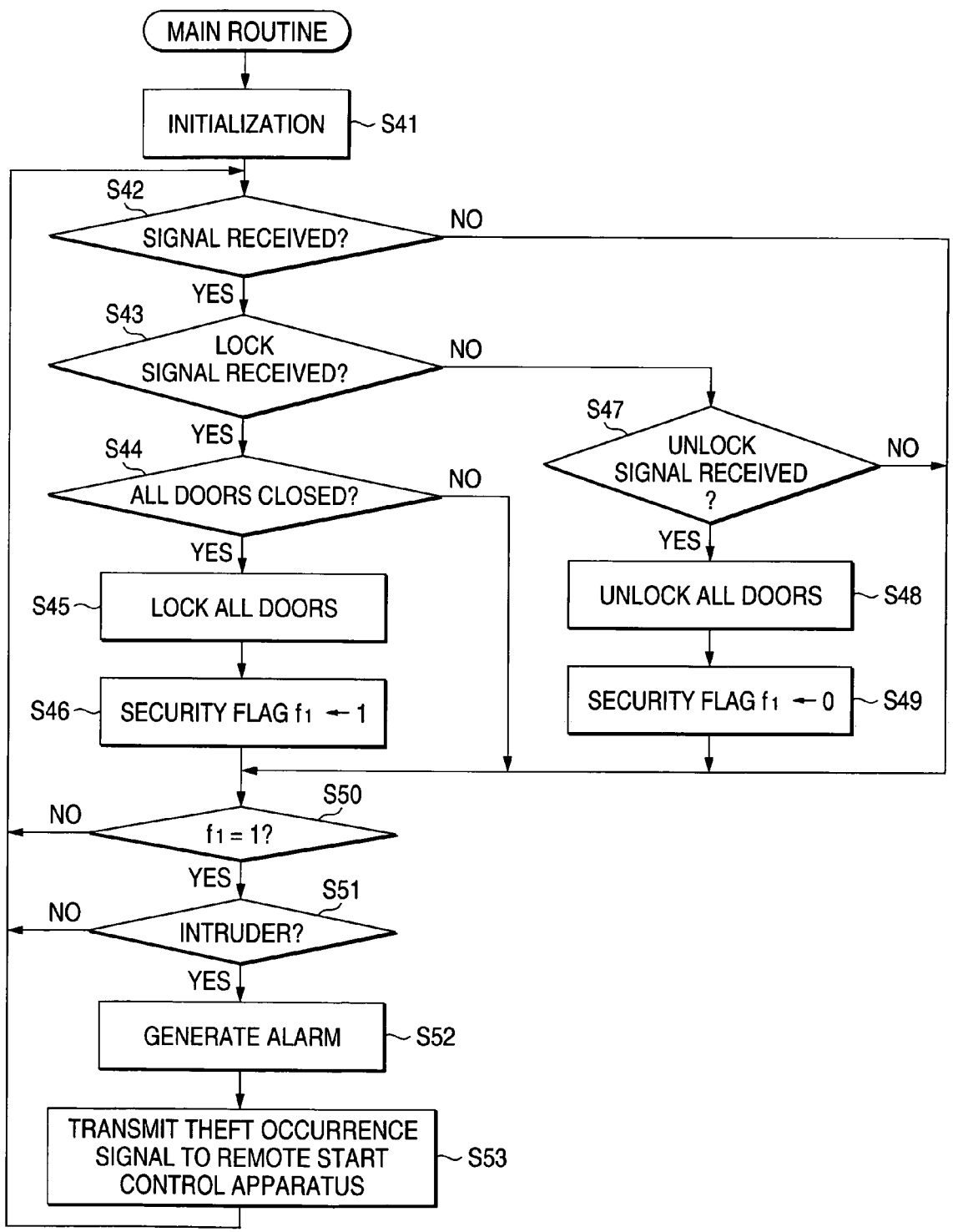
FIG. 5 is a flowchart showing the processing performed by a microcomputer in a security unit.

Following this, the processing (3) (a main routine) performed by the microcomputer of the security unit 51 will be explained while referring to the flowchart in FIG. 5. First, a flag and a counter are initialized, cleared (step S41), and a check is performed to determine whether a signal has been received from the remote start control apparatus 31 (step S42).

When it is determined that a signal has been received from the remote start control apparatus 31, a check is performed to determine whether the signal includes a door lock instruction (step S43). When it is determined that the signal includes a door lock instruction, a signal is obtained from the door state detection sensor 52 to determine whether all the doors of the vehicle are closed (step S44).

When it is determined that all the doors are closed, command of the door lock actuator 54 is exercised to lock the doors (step S45), and a security mode is selected by setting a security flag $f_1$ to "1" (step S46). Thereafter, program control advances to step S50. But when it is determined at step S44 that one of the doors is open, program control is shifted to step S50.

When it is determined at step S43 that the signal received from the remote start control apparatus 31 is not a door lock instruction, a check is performed to determine whether the signal includes a door unlock instruction (step S47). When it is determined that the signal includes a door unlock instruction, command of the door lock actuator 54 is exercised to unlock the door (step S48) and the security mode is canceled by setting the security flag $f_1$ to "0" (step S49).

Program control thereafter moves to step S50. But when it is determined that the signal includes neither a door lock instruction nor a door unlock instruction, program control is shifted to step S50.

At step S50, a check is performed to determine whether the security flag $f_1$ is set to "1", i.e., whether the security mode is selected. When it is determined that the security mode is selected, a signal obtained by the intruder detection sensor 55 is employed to determine whether an unauthorized vehicle entry has occurred (step S51).

When it is determined that an unauthorized vehicle entry has occurred, command control of the warning sound generator 56 is exercised to generate a warning sound, or command control of the lamp turn on unit 57 is exercised to turn on a hazard lamp (step S52). Then, a theft occurrence signal indicating a theft has taken place is transmitted to the remote start control apparatus 31 (step S53), and thereafter, program control returns to step S42. The processing performed when the remote start control apparatus 31 receives the theft occurrence signal will be described later in detail while referring to the flowchart in FIG. 6.

When it is determined at step S50 that the security flag $f_1$ is not set to "1", i.e., that the security mode is not selected, or at step S51 that the unauthorized vehicle entry did not occur, program control returns to step S42.

Figure 6:
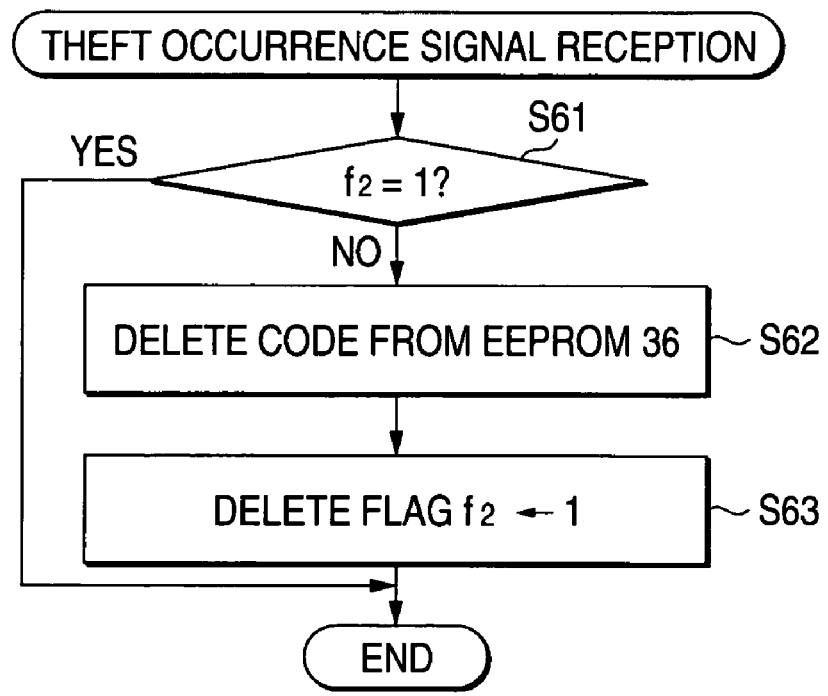
FIG. 6 is a flowchart showing the processing performed by the microcomputer of the remote start control apparatus according to the first embodiment.

While referring to the flowchart in FIG. 6, an explanation will be given for the processing (1)-2 performed by the microcomputer 32 of the remote start control apparatus 31 according to the first embodiment. The processing (1)-2 is performed when the theft occurrence signal (see step S53 in FIG. 3) is received from the security unit 51 in the main routine.

When the theft occurrence signal is received from the security unit 51, first, a check is performed to determine whether a delete flag $f_2$ has been set to "1", indicating that the code stored in the EEPROM 36 (code that is supposed to match the unique vehicle code stored in the immobilizer unit 6) has been deleted (step S61).

When it is determined that the delete flag $f_2$ is not set to "1", i.e., that the code has not yet been deleted, the code stored in the EEPROM 36 is deleted (step S62), and thereafter, the delete flag $f_2$ is set to "1" (step S63). Therefore, when an unauthorized vehicle entry is detected, the code stored in the EEPROM 36 is deleted. When it is determined that the delete flag $f_2$ has been set to "1", i.e., the code has already been deleted, the processing (1)-2 is terminated. In this example, the code stored in the EEPROM 36 is deleted; however, instead of deleting the code, it may be overwritten by a completely different code.

Figure 7:
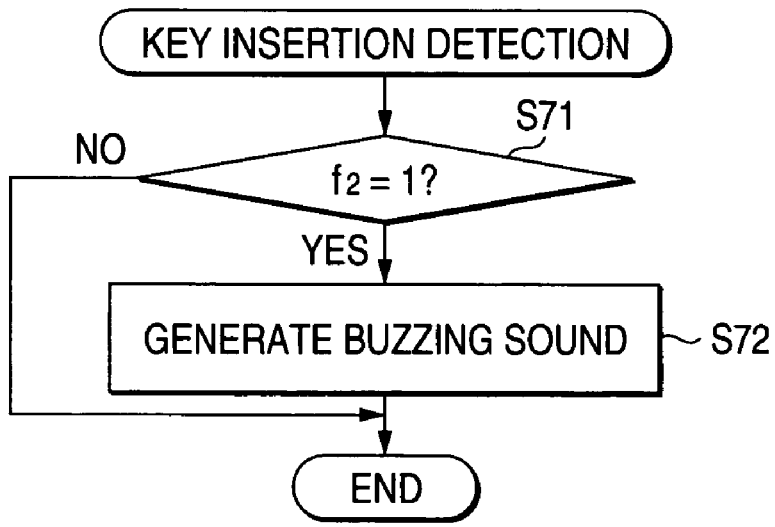
FIG. 7 is a flowchart showing the processing performed by the microcomputer of the remote start control apparatus according to the first embodiment.

Next, while referring to the flowchart in FIG. 7, an explanation will be given for the processing (1)-3 performed by the microcomputer 32 of the remote start control apparatus 31 according to the first embodiment. The processing (1)-3 is performed when, in the main routine, the insertion of the ignition key 1 into the key cylinder 4 is detected.

When the ignition key 1 is inserted into the key cylinder 4, first, a check is performed to determine whether the delete flag $f_2$ is set to "1" (step S71). When it is determined that the delete flag $f_2$ is set to "1", command control of the buzzer generator 38 is exercised to generate a buzzing sound and notify the driver that the code stored in the EEPROM 36 (code that is supposed to match the unique vehicle code stored in the immobilizer unit 6) has been deleted (step S72).

When it is determined that the delete flag $f_2$ is not set to "1", i.e., the code stored in the EEPROM 36 has not been deleted, the processing (1)-3 is terminated.

Figure 8:
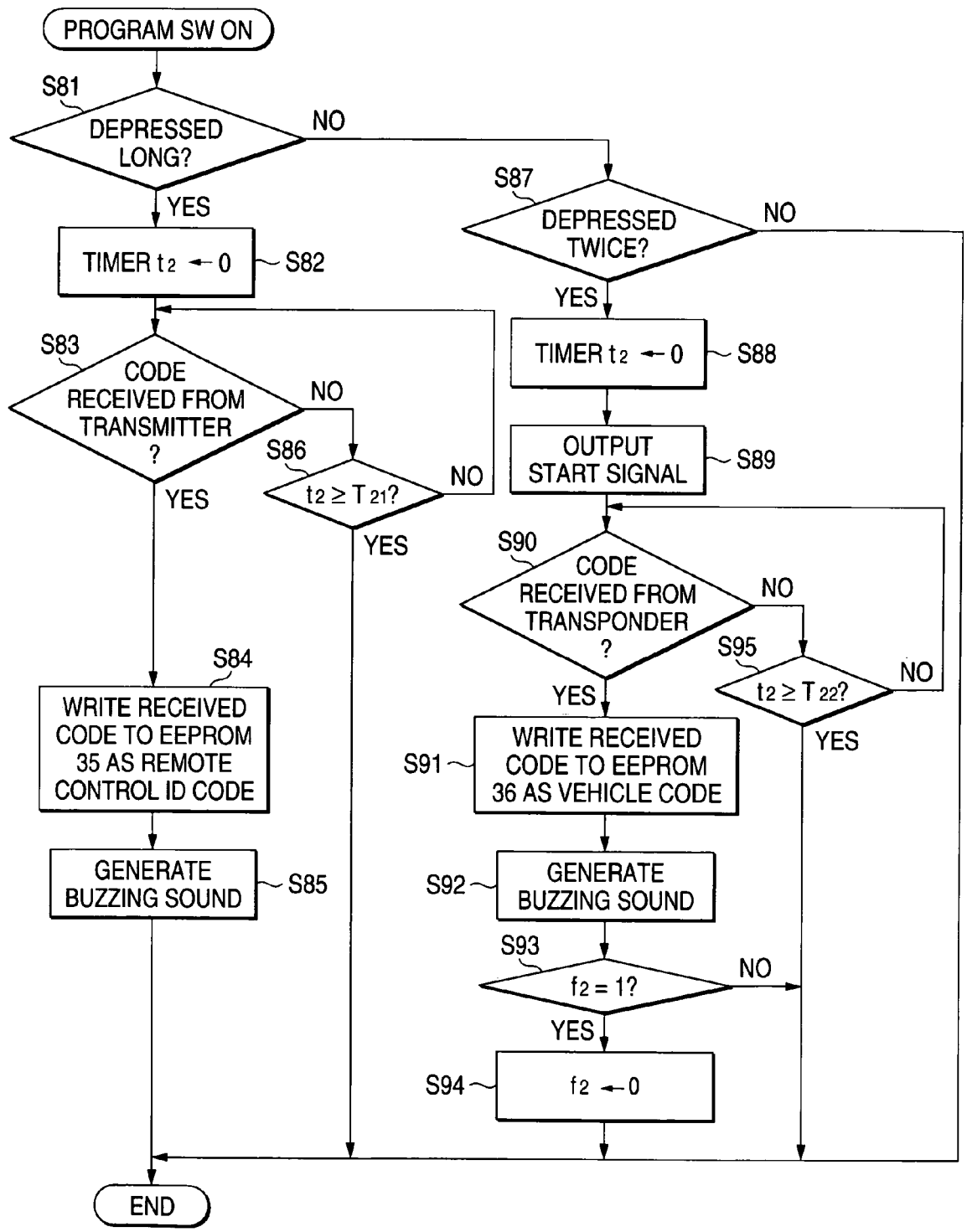
FIG. 8 is a flowchart showing the processing performed by the microcomputer of the remote start control apparatus according to the first embodiment.

Next, while referring to the flowchart in FIG. 8, an explanation will be given for the processing (1)-4 performed by the microcomputer 32 of the remote start control apparatus 31 according to the first embodiment. The processing (1)-4 is performed when the depression of the program switch 37 is detected. During this processing, a remote control ID code registered in the portable transmitter 41 is written in the EEPROM 35, and a unique vehicle code stored in the chip 3 of the ignition key 1 is written in the EEPROM 36.

When the program switch 37 is depressed, first, a check is performed to determine whether the depression mode is a first mode (e.g., a long depression of two seconds or longer) (step S81). When it is determined that the depression mode is a long depression, the remote control ID code registration process beginning at step S82 is performed. First, the timer $t_2$ is started by setting the value to 0 (step S82), and a check is performed to determine whether a signal has been received from the portable transmitter 41 via the antenna 33 and the reception unit 34 (step S83).

When it is determined that the signal has been received from the portable transmitter 41, a remote control ID code included in the received signal is written in the EEPROM 35 to register the remote control ID code (step S84). Thereafter, command control of the buzzer generator 38 is exercised to generate a buzzing sound and notify the user that the registration of the remote control ID code has been completed (step S85).

When it is determined that a signal has not been received from the portable transmitter 41, a check is performed to determine whether, according to the timer $t_2$, a predetermined period $T_{21}$ (e.g., 30 seconds) has elapsed (step S86). When it is determined, according to the timer $t_2$, that the predetermined period $T_{21}$ has elapsed, the processing (1)-4 is terminated. But when it is determined, according to the timer $t_2$, that the predetermined period $T_{21}$ has not elapsed, program control returns to step S83, where the reception of the signal is waited for.

When it is determined at step S81 that the depression time for the program switch 37 was not long, a check is performed to determine whether the depression mode is a second mode (e.g., a double depression) (step S87). When it is determined that the depression mode is a double depression, the unique vehicle code registration process beginning at step S88 is performed. First, the timer $t_2$ is set to 0 and started (step S88), and thereafter, the same pulse start signal as the start signal output by the immobilizer unit 6 is transmitted to the signal line L1 and supplied to the transponder 5 (step S89).

Upon receiving the start signal, the transponder 5 employs a wireless connection to communicate with the chip 3 of the ignition key 1 inserted into the key cylinder 4 and obtain a code stored in the chip 3, and transmits the code, together with a clock signal, to the immobilizer unit 6 along the signal line L2.

After the start signal has been transmitted, a check is performed to determine whether a code (i.e., a code that is registered in the ignition key 1 inserted into the key cylinder 4, and that is supposed to match the unique vehicle code registered in advance in the immobilizer unit 6) has been received from the transponder 5 (step S90). When it is determined that the code has been received from the transponder 5, the received code is written in the EEPROM 36 to register the unique vehicle code (step S91). Thereafter, command control of the buzzer generator 38 is exercised to generate a buzzing sound and notify the driver that the registration of the unique vehicle code has been completed (step S92).

Following this, a check is performed to determine whether the delete flag $f_2$ has been set to "1", which indicates that the code stored in the EEPROM 36 has been deleted (step S93). When it is determined that the delete flag $f_2$ has been set to "1", the delete flag $f_2$ is reset to "0" (step S94). And when it is determined that the delete flag $f_2$ is not set to "1", i.e., the delete flag $f_2$ is set to "0", the delete flag $f_2$ does not need to be reset to "0", and the processing (1)-4 is terminated.

When it is determined at step S90 that the code has not been received from the transponder 5, a check is performed to determine whether, according to the timer $t_2$, a predetermined period $T_{22}$ (e.g., one second) has elapsed (step S95). When it is determined, according to the timer $t_2$, that the predetermined period $T_{22}$ has elapsed, the processing (1)-4 is terminated. When it is determined, according to the timer $t_2$, that the predetermined period $T_{22}$ has not elapsed, program control returns to step S90, where the reception of the code from the transponder 5 is waited for.

According to the remote start control apparatus 31 of the first embodiment, when the engine start instruction signal is received from the portable transmitter 41, the code stored in the EEPROM 36 is transmitted to the immobilizer unit 6. Therefore, when the engine start instruction is issued by a remote operation using the portable transmitter 41, a specific code is supplied to the immobilizer unit 6 in the same manner as when the authorized ignition key 1 is inserted into the key cylinder 4.

Therefore, since a code that matches the unique vehicle code registered in advance in the immobilizer unit 6 is stored in the EEPROM 36, the immobilizer unit 6 can permit the starting of the engine upon the reception of an engine start instruction from the portable transmitter 41. Thus, the engine can be started by a remote operation, instead of inserting the authorized ignition key 1 into the key cylinder 4 and turning it.

Further, according to the remote start control apparatus 31 according to the first embodiment, when an unauthorized vehicle entry is detected, the code (the code that is supposed to match the unique vehicle code) is deleted from the EEPROM 36. Therefore, when a thief breaks into a vehicle, steals the remote start control apparatus 31 and analyzes data stored therein, the unique vehicle code will already have been deleted, so that the unique vehicle code can not be identified as a result of the theft. Therefore, the ignition key in which the unique vehicle code is stored can be protected from being copied, and even when the remote start control apparatus 31 is stolen, the vehicle can be protected from being stolen.

Furthermore, according to the remote start control apparatus 31 of the first embodiment, when the theft occurrence signal is received from the security unit 51, the code is deleted from the EEPROM 36. And as one modification, the remote start control apparatus may include: a function for detecting a disconnection from a battery installed in a vehicle, and an auxiliary power source to ensure operating continuity when the disconnection from the battery occurs. In this case, when the disconnection from the battery is detected (e.g., when the remote start control apparatus installed in a vehicle, which is stolen by a thief who broke into the vehicle, is disconnected from the battery), the code stored in the EEPROM 36 may be deleted. For detecting a disconnection from a battery, an example method is available that can determine whether a battery voltage is equal to or lower than a predetermined value.

An explanation will now be given for an engine start system employing the remote start control apparatus according to a second embodiment. Since the engine start system has substantially the same configuration as is shown in FIG. 1, except for the remote start control apparatus 31 and the microcomputer 32 of this apparatus 31, different reference numerals are provided only for the remote start control apparatus and the microcomputer, and no further explanation for it will be given.

Since the processing (4)-1 (a main routine), the processing (4)-1a (an engine start process) and the processing (4)-3 (a code deletion notification process) performed by a microcomputer 32A of a remote start control apparatus 31A according to the second embodiment are the same as the processing (1)-1 in FIG. 2, the processing (1)-1a in FIG. 3 and the processing (1)-4 in FIG. 7, no explanation for these processes will be given.

In addition, since the processing (the main routine) performed by the microcomputer (not shown) of an immobilizer unit 6, and the processing (the main routine) performed by the microcomputer (not shown) of a security unit 51 are the same as the processing (2) in FIG. 4 and the processing (3) in FIG. 5, no explanation for these processes will be given.

Figure 9:
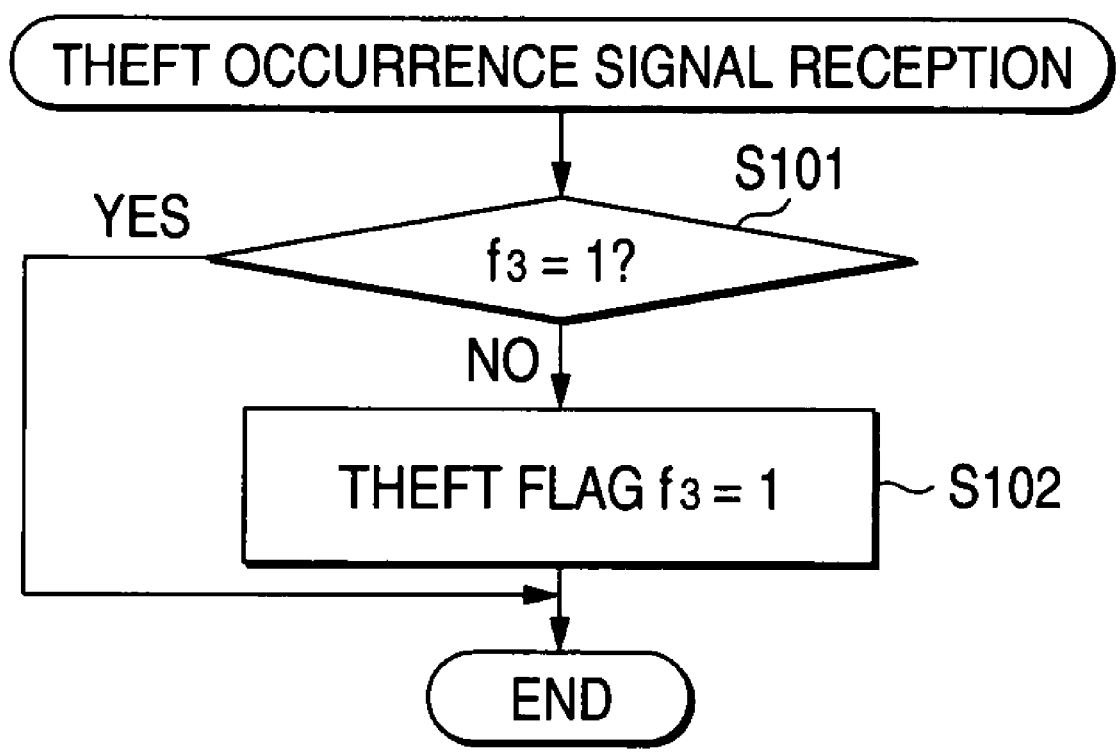
FIG. 9 is a flowchart showing the processing performed by a microcomputer in a remote start control apparatus according to a second embodiment of the invention.

Processing (4)-2 performed by the microcomputer 32A of the remote start control apparatus 31A according to the second embodiment will now be described while referring to the flowchart in FIG. 9. The processing (4)-2 is initiated when, in the main routine, a theft occurrence signal (see at step S53 in FIG. 5) is received from the security unit 51.

When a theft occurrence signal is received from the security unit 51, first, a check is performed to determine whether a theft flag $f_3$, which represents the occurrence of a theft, is set to "1" (step S101). When it is determined that the theft flag $f_3$ is not set to "1", the theft flag $f_3$ is set to "1" (step S102).

When it is determined that the theft flag $f_3$ is set to "1", the process at step S102 need not be performed, and the processing (4)-2 is terminated.

Figure 10:
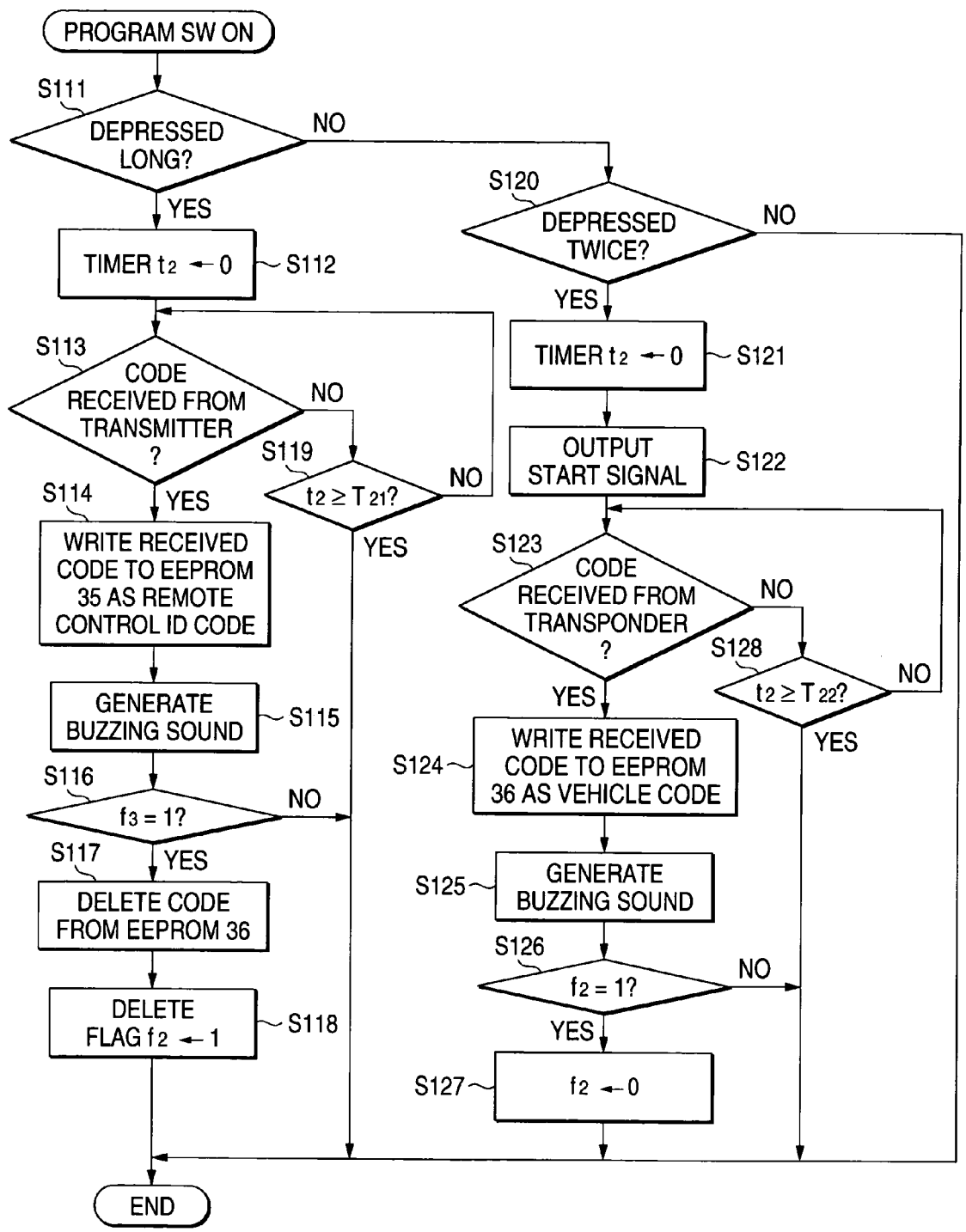
FIG. 10 is a flowchart showing the processing performed by the microcomputer of the remote start control apparatus according to the second embodiment.

Next, the processing (4)-4 performed by the microcomputer 32 of the remote start control apparatus 31A according to the second embodiment will be described while referring to the flowchart in FIG. 10. The processing (4)-4 is initiated when the depression of a program switch 37 is detected.

When the program switch 37 is depressed, first, a check is performed to determine whether the depression mode is a first mode (e.g., a long depression of two seconds or longer) (step S111). When it is determined that the depression mode is a long depression, beginning at step S112 the remote control ID code registration process is performed. First, a timer $t_2$ is started by setting it to "0" (step S112), and a check is performed to determine whether a signal has been received from a portable transmitter 41 via an antenna 33 and a reception unit 34 (step S113).

When it is determined that a signal has been received from the portable transmitter 41, a remote control ID code included in the received signal is written in an EEPROM 35 to register the remote control ID code (step S114). Thereafter, command control of a buzzer generator 38 is exercised to generate a buzzing sound and notify a driver that the registration of the remote control ID code has been completed (step S115).

Then, a check is performed to determine whether the theft flag $f_3$ is set to "1" (step S116). When it is determined that the theft flag $f_3$ is set to "1", i.e., that the remote control ID code was registered when the theft occurred, it is assumed that the registration was performed by a criminal, and a code stored in an EEPROM 36 (e.g., a code that was supposed to match a vehicle unique code registered in the immobilizer unit 6) is deleted (step S117). Then, a delete flag $f_2$ is set to "1" (step S118). When it is determined that the theft flag $f_3$ is not set to "1", it is assumed that an authorized user performed the registration by using the transmitter 41 and the processing (4)-4 is terminated without a code deletion being performed. In this case, the code stored in the EEPROM 36 is deleted; however, as a modification, the code may be rewritten to obtain a completely different code.

When it is determined at step S113 that the signal has not been received from the portable transmitter 41, a check is performed to determine whether, according to the timer $t_2$, a predetermined period $T_{21}$ (e.g., 30 seconds) has elapsed (step S119). When it is determined, according to the timer $t_2$, that the predetermined period $T_{21}$ has elapsed, the processing (4)-4 is terminated. But when it is determined, according to the timer $t_2$, that the predetermined period $T_{21}$ has not yet elapsed, program control returns to step S113, where the reception of a signal is waited for.

The process at step S116 may not be performed; however, by employing the process at step S116, it can be estimated, to a degree, that the registration performed using the transmitter 41 was performed either by an authorized user or by a thief, and at least when the registration is performed while the presence of the theft had not been detected, it can be assumed that the authorized user performed the registration. Therefore, the code deletion is not performed in this case, i.e., the performance of an unnecessary process can be avoided.

When it is determined at step S111 that the depression of program switch 37 was not long, a check is performed to determine whether the depression mode is a second mode (e.g., a double depression) (step S120). And when it is determined that the depression mode is a double depression, beginning at step S121 a unique vehicle code registration process is performed. First, the timer $t_2$ is started by setting it to "0" (step S121), and the same pulse start signal as a start signal output by the immobilizer unit 6 is transmitted to a signal line L1 and supplied to a transponder 5 (step S122).

Upon receiving the start signal, the transponder 5 employs a wireless connection to communicate with a chip 3 of an ignition key 1 inserted into a key cylinder 4, and obtains a code stored in the chip 3 and transmits the code, together with a clock signal, to the immobilizer unit 6 along a signal line L2.

After the start signal has been transmitted, a check is performed to determine whether a code (i.e., a code registered in the ignition key 1 inserted into the key cylinder 4, which is supposed to match the vehicle unique code stored in advance in the immobilizer unit 6), is received from the transponder 5 along the signal line L2 (step S123). When it is determined that the code has been received from the transponder 5, the received code is written in the EEPROM 36 to register a vehicle unique code (step S124). Thereafter, operating control of the buzzer generator 38 is exercised to generate a buzzing sound and notify the driver that the registration of the vehicle unique code has been completed (step S125).

A check is then performed to determine whether the delete flag $f_2$ is set to "1", indicating that the code has been deleted from the EEPROM 36 (step S126). When it is determined that the delete flag $f_2$ is set to "1", the delete flag $f_2$ is cleared, reset to "0" (step S127). When it is determined that the delete flag $f_2$ is not set to "1", i.e., is set to "0", the clearing, the reset to "0", need not be performed, and the processing (4)-4 is terminated.

When it is determined at step S123 that the code has not been received from the transponder 5, a check is performed to determine whether, according to the timer $t_2$, a predetermined period $T_{22}$ (e.g., one second) has elapsed (step S128). When it is determined, according to the timer $t_2$, that the predetermined period $T_{22}$ has elapsed, the processing (4)-4 is terminated. But when, according to the timer $t_2$, the predetermined period $T_{22}$ has not elapsed, program control returns to step S123, where the reception of the code from the transponder 5 is waited for.

According to the remote start control apparatus 31A of the second embodiment, when an engine start instruction signal is received from the portable transmitter 41, the code stored in the EEPROM 36 is transmitted to the immobilizer unit 6. Therefore, when the engine start instruction is issued by using the portable transmitter 41 to perform a remote operation, a specific code is supplied to the immobilizer unit 6 in the same manner as when the authorized ignition key 1 is inserted into the key cylinder 4.

Therefore, when the code that matches a unique vehicle code registered in advance in the immobilizer unit 6 is stored in the EEPROM 36, the starting of the engine can be permitted by the immobilizer unit 6 upon the reception of the engine start instruction from the portable transmitter 41. Thus, the remote operation can be used to start the engine, without the authorized ignition key 1 being inserted into the key cylinder 4 and turned.

Furthermore, according to the remote start control apparatus 31A of the second embodiment, when it is determined that the code (remote control ID code) is registered in the EEPROM 35, the code stored in the EEPROM 36 (e.g., the code is deleted that matches the unique vehicle code registered in the immobilizer unit 6).

As a result, even when a remote control ID code registered in the transmitter of a criminal is registered in the EEPROM 35, and the criminal can freely issue an engine start instruction to the remote start control apparatus 31A, the unique vehicle code is not supplied to the immobilizer unit 6 by the remote start control apparatus 31A, and the remote operation the criminal performed to start the engine is not accepted.

According to the remote start control apparatuses 31 and 31A of the first and the second embodiments, the code (unique vehicle code) stored in the EEPROM 36 is deleted to inhibit the acceptance of the remote operation the criminal performed to start the engine. In order for a remote operation performed by the authorized driver to be accepted after the code has been deleted, the re-registration of the unique vehicle code is required (see steps S87 to S92 in FIG. 8 and steps S120 to S125 in FIG. 10).

Figure 11:
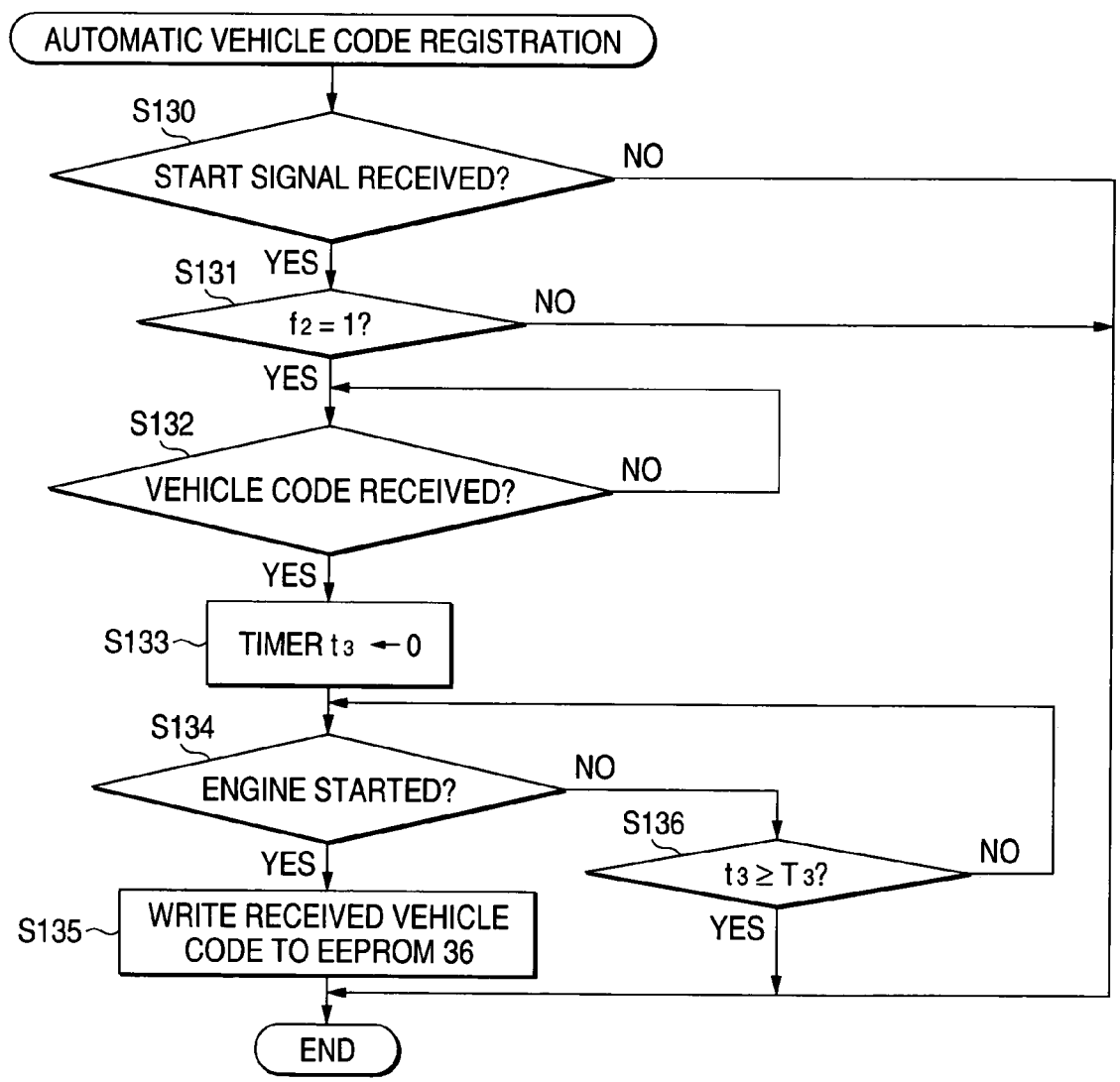
FIG. 11 is a flowchart showing the processing performed by the microcomputer of the remote start control apparatus according to one modification.

Therefore, one modification of the remote start control apparatus 31 or 31A performs the processing (1)-5 or (4)-5 for automatically re-registering a unique vehicle code. The processing (1)-5 will now be explained while referring to the flowchart in FIG. 11. This processing (1)-5 is performed in the main routine.

First, a check is performed to determine whether a start signal has been received from the immobilizer unit 6 along the signal line L1 (step S130). When it is determined that a start signal has been received, program control advances to step S131 to perform the process sequence beginning at step S131. When it is determined that the start signal has not been received, the process beginning at step S131 need not be performed, and the processing (1)-5 is terminated.

In the following two cases, the start signal is supplied to the signal line L1 by the immobilizer unit 6.

a) The ignition key 1 is inserted into the key cylinder 4 by a driver (or the ignition key 1 is turned to the ACC output position or the IG output position of the ignition switch), and a key insertion detection signal is transmitted to the signal line L3 by the key cylinder 4.

b) The switch button 44a of the portable transmitter 41 is depressed by a driver, and pseudo signals for a key insertion detection signal and other signals are transmitted to the signal line L3 by the remote start control apparatus 31.

However, in case a only, it is determined at step S130 that the start signal has been received. This is because in case b, the reception of a start signal occurs only when a start process, explained while referring to the flowcharts in FIGS. 2 and 3, is performed.

When it is determined at step S130 that the start signal has been received, a check is performed to determine whether the delete flag $_2$ is set to "1" (step S131). When it is determined that the delete flag $f_2$ is not set to "1", i.e., a code that matches the unique vehicle code registered in the immobilizer unit 6 is stored in the EEPROM 36, the registration of the unique vehicle code need not be performed, and the processing (1)-5 is terminated.

When it is determined that the delete flag $f_2$ is set to "1", i.e., the unique vehicle code is not stored in the EEPROM 36, a check is performed to determine whether a code supplied to the signal line L2 by the transponder 5 (i.e., a code obtained by the transponder 5 through wireless communication with the chip 3 of the ignition key 1), has been received (step S132).

When it is determined that the code has not been received, program control returns to step S132, where the reception of the code is waited for. When it is determined that the code has been received, a timer $t_3$ is started by resetting it to "0" (step S133), and an alternate drive signal is employed to determine whether the engine has been started (step S134).

Since the code supplied to the signal line L2 by the transponder 5 is received not only by the remote start control apparatus 31 but also by the immobilizer unit 6, a permission signal is provided for the engine controller 7 when the code matches the unique vehicle code (i.e., when the authorized ignition key 1 is inserted into the key cylinder 4).

Therefore, when the authorized ignition key 1 is turned to the starter output position, the engine is started. In other words, when the starting of the engine is detected, it can be assumed that the code received from the transponder is the unique vehicle code.

Thus, when it is determined at step S134 that the engine has been started, it is assumed that the code received from the transponder 5 is the unique vehicle code, and this code (the unique vehicle code) is stored in the EEPROM 36 (step S135).

When it is determined that the engine has not been started, a check is performed to determine whether, according to the timer $t_3$, a predetermined period $T_3$ (e.g., ten seconds) has elapsed (step S136). When it is determined, according to the timer $t_3$, that the predetermined period $T_3$ has not elapsed, program control returns to step S134, and whether the engine has been started is again examined. And when it is determined, according to the timer $t_3$, that the predetermined period $T_3$ has elapsed, the processing (1)-5 is terminated, without writing the code to the EEPROM 36. It should be noted that when the authorized ignition key 1 inserted into the key cylinder 4 is not turned to the starter output position before the predetermined period $T_3$ elapses, the engine is not started within the predetermined period $T_3$.

As is described above, after the code has been deleted from the EEPROM 36 and when the code (the unique vehicle code) is received as the ignition key 1 is inserted into the key cylinder 4, the received code is automatically stored in the EEPROM 36. Therefore, the unique vehicle code can be re-registered without any action by the driver being required.

Figure 12:
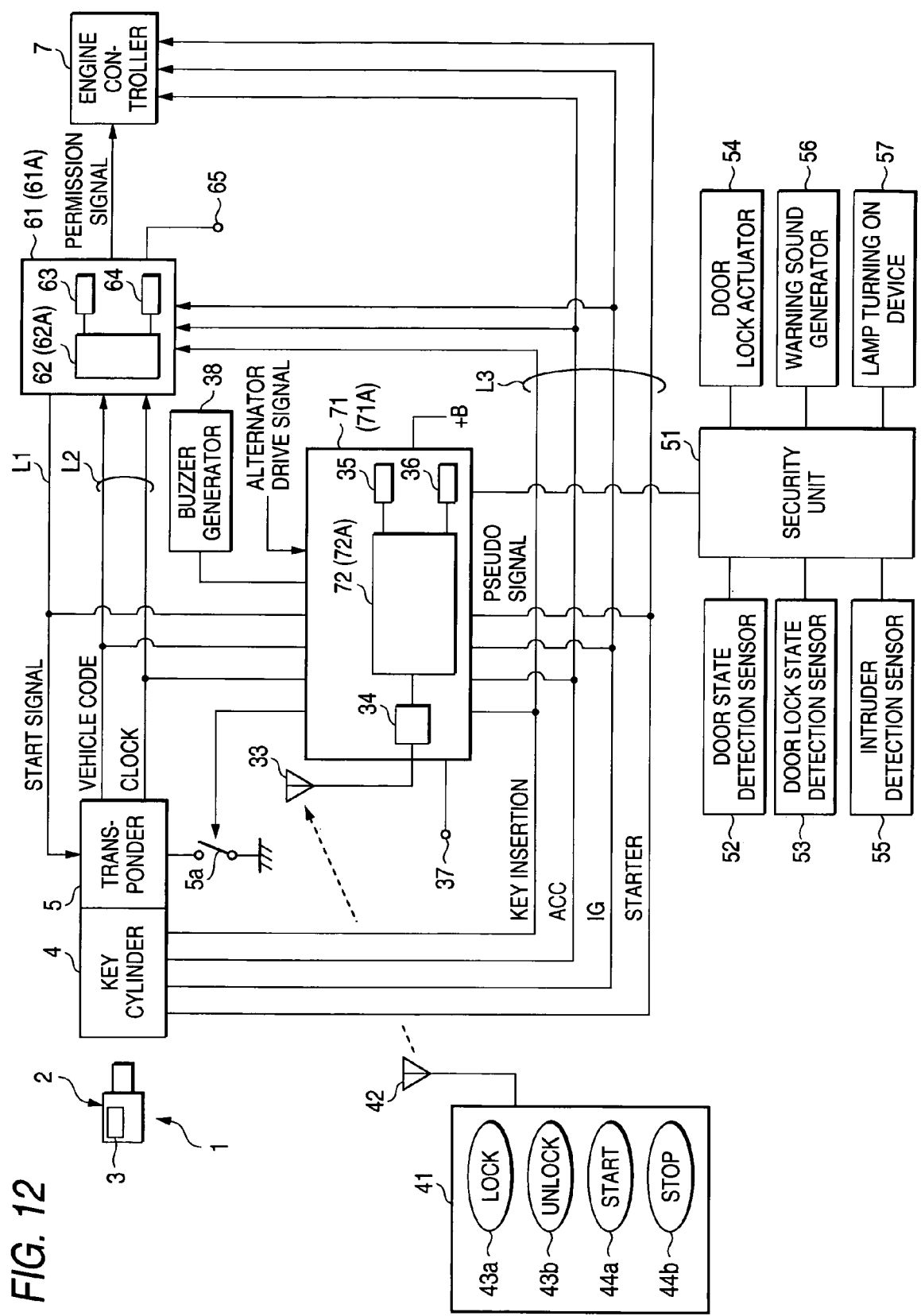
FIG. 12 is a schematic block diagram showing the essential portion of an engine start system employing a remote start control apparatus according to a third embodiment of the invention and a start control apparatus according to a fourth embodiment.

FIG. 12 is a schematic block diagram showing the essential portion of an engine start system employing a remote start control apparatus according to a third embodiment and a start control apparatus according to a fourth embodiment. The same reference numerals as are used for the engine start system shown in FIG. 1 are also employed to denote corresponding components, and no further explanation for them will be given.

The engine start system includes: an ignition key 1 that incorporates, in a grip portion 2, a chip 3 that is used to store a unique vehicle code and includes a transmission function; a key cylinder 4; a transponder 5 attached to the key cylinder 4; an immobilizer unit 61 that stores a unique vehicle code and serves as an antitheft device; an engine controller 7 for performing engine control functions, such as the starting of an engine; a remote start control apparatus 71; a portable transmitter 41; and a security unit 51.

The immobilizer unit 61 includes: a microcomputer 62, an EEPROM 63 in which is stored a code that matches a unique vehicle code stored in the chip 3 of the ignition key 1; an EEPROM 64 in which is stored a code that matches a specific code stored in an EEPROM 36 of the remote start control apparatus 71; and a program switch 65 used for registration of the code.

The remote start control apparatus 71 includes: a microcomputer 72; an antenna 33 for receiving a signal from the portable transmitter 41; an EEPROM 35 in which a remote control ID code is stored; the EEPROM 36 in which a specific code is stored; and a program switch 37 used to register a remote control ID code (i.e., to write a remote control ID code to the EEPROM 35). Instead of the EEPROM 26, the same chip (a unique vehicle code is different) as the chip 3 incorporated by the ignition key 1 may be employed as a memory for storing a specific code.

When the ignition key 1 is inserted into the key cylinder 4 by a driver (or the ignition key 1 is turned to the ACC output position or the IG output position of an ignition switch), a key insertion detection signal goes High, and upon receiving this signal, the immobilizer unit 61 transmits a start signal to the transponder 5 along a signal line L1.

Upon the receiving the start signal, the transponder 5 employs a wireless connection to communicate with the chip 3 of the ignition key 1 inserted into the key cylinder 4, and obtains a code from the chip 3 and transmits the code, together with a clock signal, to the immobilizer unit 61 across a signal line L2.

The immobilizer unit 61 determines whether the code received from the transponder 5 matches a unique vehicle code (stored in advance in the immobilizer unit 61). When these two codes match, i.e., the authorized ignition key 1 has been inserted into the key cylinder 4, the immobilizer unit 61 transmits a permission signal to the engine controller 7 to permit the starting of an engine.

When the engine controller 7 receives a start signal from the key cylinder 4 after receiving the permission signal, it performs engine control processes, such as a fuel supply process and an ignition time setting process. But when the engine controller 7 has received the starter signal but has not yet received the permission signal, it performs no engine control function.

As is described above, the engine can not be started unless the code stored in the chip 3 of the ignition key 1 is identical to the unique vehicle code stored in the immobilizer unit 61. Therefore, the direct connection of an unauthorized ignition key or ignition switch inhibits the starting of the engine, so that the theft of a vehicle can be prevented. It should be noted that the remote start control apparatus 71 is connected to the signal lines L1 to L3, along which it can exchange various signals.

Since the processing (5)-1 (a main routine) and the processing (5)-1a (an engine start process) performed by the microcomputer 72 of the remote start control apparatus 71 according to the third embodiment are the same as the processing (1)-1 in FIG. 2 and the processing (1)-1a in FIG. 3, no further explanation for them will be given.

Further, since the processing (the main routine) performed by the microcomputer (not shown) of the security unit 51 is the same as the processing (2) in FIG. 4, no further explanation for it will be given.

Figure 13:
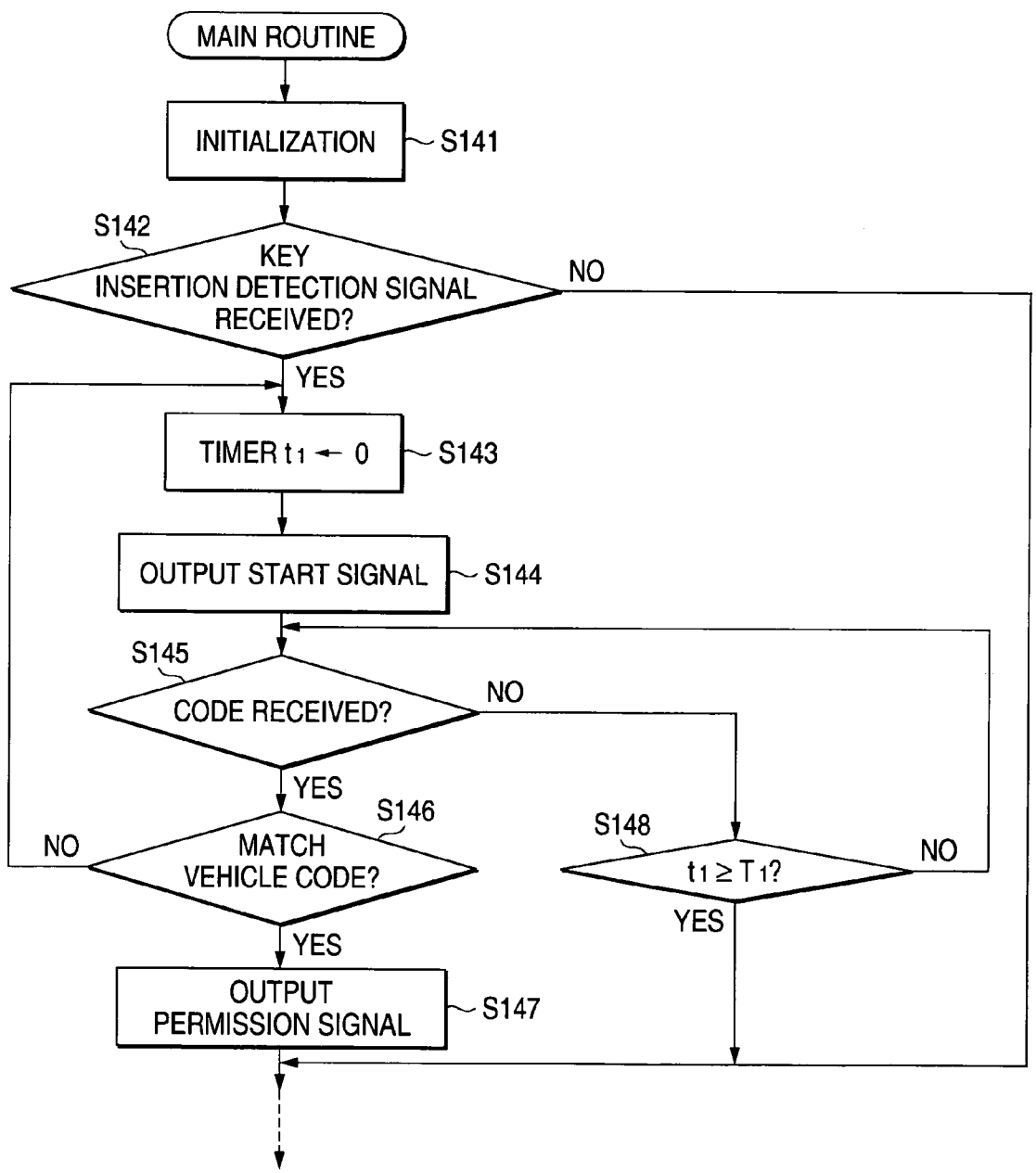
FIG. 13 is a flowchart showing the processing performed by a microcomputer in the start control apparatus (immobilizer unit) according to the fourth embodiment.

Next, the processing (6) (a main routine) performed by a microcomputer 61 of the start control apparatus (immobilizer unit 61) according to the fourth embodiment will be described while referring to the flowchart in FIG. 13. First, a flag and a counter are initialized, cleared (step S141), and a check is performed to determine whether a key insertion detection signal has been received from the key cylinder 4, or a pseudo signal (corresponding to a key insertion detection signal) has been received from the remote start control apparatus 71 (step S142).

When it is determined that either the key insertion detection signal or the pseudo signal has been received, a timer $t_1$ is started by resetting it to "0" (step S143), and a start signal is transmitted to the signal line L1 and is supplied to the transponder 5 and/or the remote start control apparatus 71 (step S144). When it is determined that neither the key insertion detection signal nor the pseudo signal has been received, the processing (6) is terminated.

Upon receiving the start signal, the transponder 5 employs a wireless connection to communicate with the chip 3 of the ignition key 1 inserted into the key cylinder 4, and obtains a code stored in the chip 3 and transmits the code, together with a clock signal, to the immobilizer unit 61 along the signal line L2. Likewise, when the remote start control apparatus 71 receives the start signal after transmitting the pseudo signal, it transmits a code stored in the EEPROM 36, together with a clock signal, to the immobilizer unit 61 along the signal line L2 (see step S15 in FIG. 3).

After the start signal has been transmitted at step S144, a check is performed to determine whether the code has been received from the transponder 5 or the code has been received from the remote start control apparatus 71 (step S145). When it is determined that one of the codes has been received, a check is performed to determine whether the received code matches one of the unique vehicle codes stored in advance in the EEPROMs 63 and 64 (step S146).

When it is determined that the received code matches one of the unique vehicle code, i.e., the authorized ignition key 1 has been inserted into the key cylinder 4 or the remote operation has been performed by the authorized portable transmitter 41, the permission signal to permit the starting of the engine is transmitted to the engine controller 7 (step S147). When it is determined that the received code matches none of the unique vehicle codes, program control returns to step S143, the timer $t_1$ is reset to 0, and the start signal is again supplied to the signal line L1.

When it is determined at step S145 that neither code has been received, a check is performed to determine whether, according to the timer $t_1$, a predetermined period $T_1$ (e.g., one second) has elapsed (step S148). When it is determined, according to the timer $t_1$, that the predetermined period $T_1$ has elapsed, the processing (6) is terminated. But when it is determined, according to the timer $t_1$, that the predetermined period $T_1$ has not elapsed, program control returns to step S145, where the reception of the code is waited for.

Figure 14:
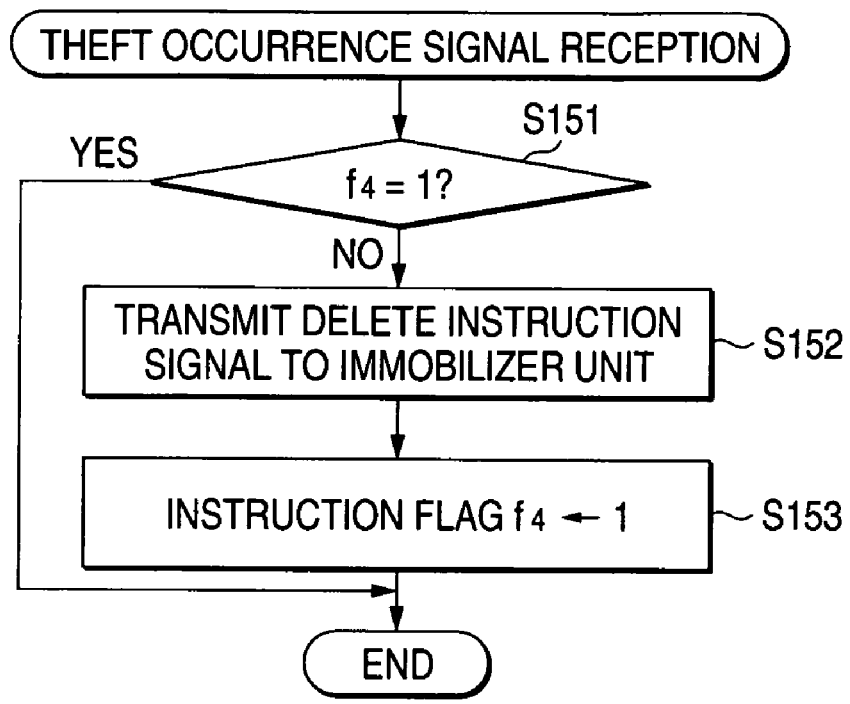
FIG. 14 is a flowchart showing the processing performed by the microcomputer of the remote start control apparatus according to the third embodiment.

While referring to the flowchart in FIG. 14, an explanation will now be given for the processing (5)-2 performed by the microcomputer 72 of the remote start control apparatus 71 according to the third embodiment. The processing (5)-2 is initiated when, in the main routine, a theft occurrence signal (see step S53 in FIG. 5) is received from the security unit 51. During this processing, a delete instruction signal is transmitted to the immobilizer unit 61 to instruct the deletion of a code stored in the EEPROM 64 of the immobilizer unit 61.

Upon receiving a theft occurrence signal from the security unit 51, first, a check is performed to determine whether an instruction flag $f_4$ is set to "1", indicating that a delete instruction signal has already been transmitted to the immobilizer unit 61 (step S151).

When it is determined that the delete instruction flag $f_4$ is not set to "1", i.e., the delete instruction signal has not yet been transmitted, the delete instruction signal is transmitted to the immobilizer unit 61 (step S152), and thereafter, the instruction flag $f_4$ is set to "1" (step S153). When it is determined that the instruction flag $_4$ is set to "1", i.e., the delete instruction signal has already been transmitted, the processing (5)-2 is terminated.

A special signal line may be provided for transmitting the delete instruction signal to the immobilizer unit 61. However, in this embodiment, the signal line L2 for the unique vehicle code is employed to transmit the delete instruction signal. When the theft occurrence signal is received, it means that an authorized driver is not present and the ignition key 1 has not been inserted into the key cylinder 4, and the unique vehicle code is not transmitted. Therefore, no problem occurs when the signal line L2 is also used to transmit the delete instruction signal.

When the immobilizer unit 61 receives the delete instruction signal, it deletes a code stored in the EEPROM 64 (i.e., a code that is supposed to match a specific code stored in the EEPROM 36 of the remote start control apparatus 71). In this embodiment, the code stored in the EEPROM 64 is deleted; however, as one modification, the code may be rewritten to obtain a completely different code.

Figure 15:
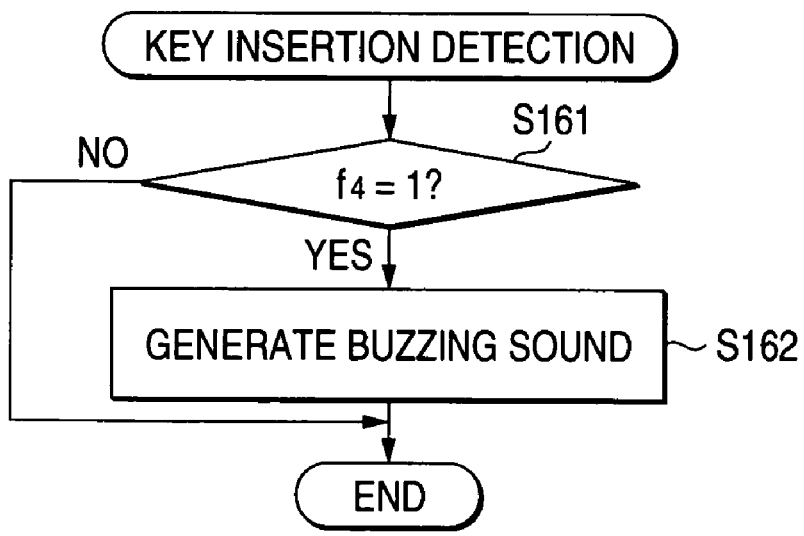
FIG. 15 is a flowchart showing the processing performed by the microcomputer of the remote start control apparatus according to the third embodiment.

While referring to the flowchart in FIG. 15, an explanation will now be given for the processing (5)-3 (a code deletion notification process) performed by the microcomputer 72 of the remote start control apparatus 71 according to the third embodiment. The processing (5)-3 is initiated when, in the main routine, it is detected along the signal line L3 that the ignition key 1 has been inserted into the key cylinder 4.

When the ignition key 1 has been inserted into the key cylinder 4, first, a check is performed to determine whether the instruction flag $f_4$ is set to "1" (step S161). When it is determined that the instruction flag $f_4$ is set to "1", the buzzer generator 38 is permitted to generate a buzzing sound and notify a driver that the code stored in the EEPROM 64 of the immobilizer unit 61 (a code that is supposed to match a specific code stored in the EEPROM 36 of the remote start control apparatus 71) has been deleted (step S162). When it is determined that the instruction flag $f_4$ is not set to "1", i.e., the code stored in the EEPROM 64 has not been deleted, the processing (5)-3 is terminated.

Next, an explanation will be given for the processing performed to store codes in the EEPROMs 63 and 64 of the start control apparatus (immobilizer unit 61) of the start control apparatus according to the fourth embodiment. When the program switch 65 is depressed, the microcomputer 62 of the immobilizer unit 61 sets a first program mode, and thereafter writes, in the EEPROM 63, code that is stored in the chip 3 and is transmitted by the transponder 5 after the ignition key 1 is inserted into the key cylinder 4.

When the program switch 65 is depressed after the code is written to the EEPROM 63, the microcomputer 62 sets a second program mode and thereafter writes, in the EEPROM 64, code that is transmitted by the remote start control apparatus 71 upon the depression of the button switch 44a of the portable transmitter 41.

Figure 16:
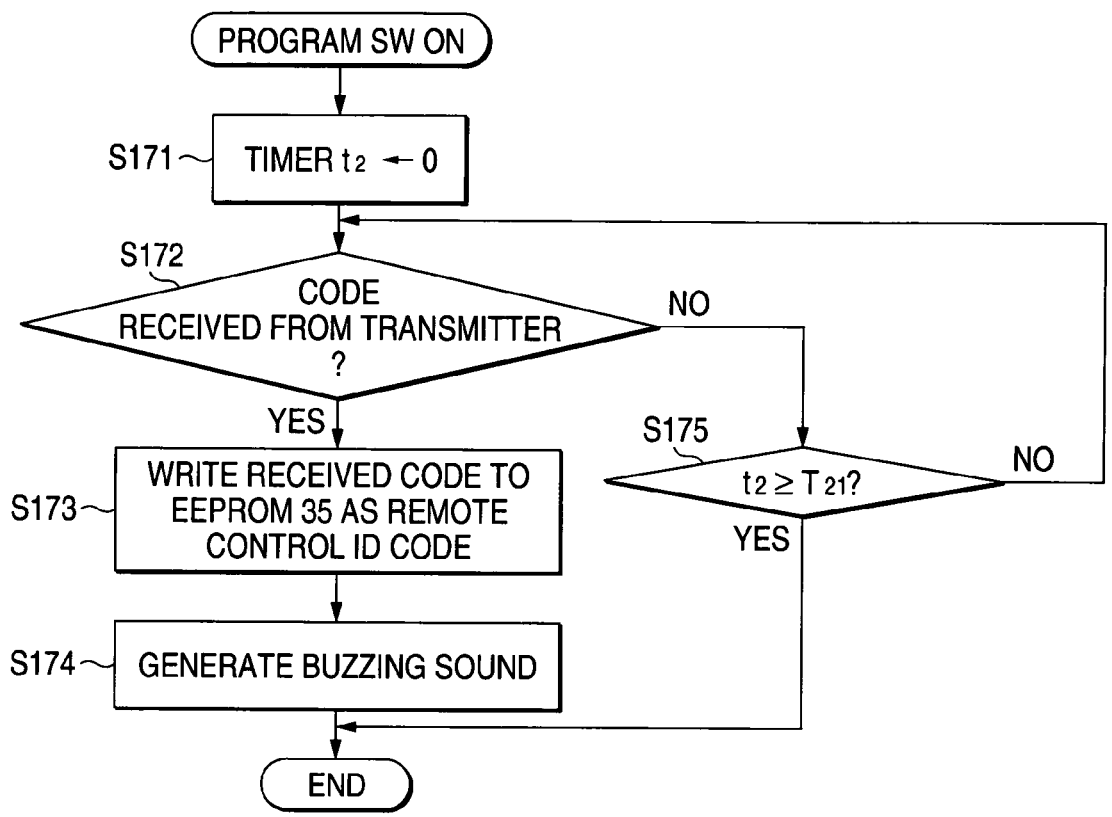
FIG. 16 is a flowchart showing the processing performed by the microcomputer of the remote start control apparatus according to the third embodiment.

The processing (5)-4 performed by the microcomputer 72 of the remote start control apparatus according to the third embodiment will now be described while referring to the flowchart in FIG. 16. The processing (5)-4 is performed when, in the main routine, the depression of the program switch 37 is detected, and during this processing, a remote control ID code registered in the portable transmitter 41 is written in the EEPROM 35.

When the program switch 37 is depressed, first, the timer $t_2$ is started by resetting it to "0" (step S171), and a check is performed to determine whether a signal has been received from the portable transmitter 41 via the antenna 33 and the reception unit 34 (step S172).

When it is determined that a signal has been received from the portable transmitter 41, a remote control ID code included in the received signal is written in the EEPROM 35 to register the remote control ID code (step S173). Thereafter, the buzzer generator 38 is permitted to generate a buzzing sound and notify a driver that the registration of the remote control ID code has been completed (step S174).

When it is determined that a signal has not been received from the portable transmitter 41, a check is performed to determine whether, according to the timer $t_2$, a predetermined period $T_{21}$ (e.g., 30 seconds) has elapsed (step S175). When it is determined, according to the timer $t_2$, that the predetermined period $T_{21}$ has elapsed, the processing (5)-4 is terminated. But when it is determined, according to the timer $t_2$, that the predetermined period $T_{22}$ has not elapsed, program control returns to step s172, where the reception of the signal is waited for.

According to the remote start control apparatus 71 of the third embodiment, when an engine start instruction signal is received from the portable transmitter 41, a code stored in the EEPROM 36 is supplied to the immobilizer unit 61. Therefore, when an engine start instruction is issued by the remote operation using the portable transmitter 41, a specific code is supplied to the immobilizer unit 61 in the same manner as when the authorized ignition key 1 is inserted into the key cylinder 4.

Therefore, when the code that matches a specific code registered in the EEPROM 36 is stored in the EEPROM 64 of the immobilizer unit 61, a specific code can be supplied to the immobilizer unit 61 upon the reception of an engine start instruction from the portable transmitter 41, and the starting of the engine can be permitted by the immobilizer unit 61. With this configuration, the engine can be started by performing a remote operation, without the authorized ignition key 1 having to be inserted into the key cylinder 4 and turned.

Further, according to the remote start control apparatus 71 of the third embodiment, when it is determined that the theft of the vehicle has occurred, the delete instruction signal is transmitted to the immobilizer unit 61, so that the code stored in the EEPROM 64 of the immobilizer unit 61 (a code that is supposed to match the specific code) is deleted.

Furthermore, according to the start control apparatus (immobilizer unit 61) of the fourth embodiment, upon receiving the delete instruction signal, the code is deleted from the EEPROM 64. Therefore, even when the remote start control apparatus 71 was stolen by a thief who broke into the vehicle, and the specific code was obtained by the thief by extracting the data stored in the apparatus 71, the specific code becomes a meaningless upon the occurrence of the theft. Therefore, when the remote start control apparatus 71 itself is stolen, greater damage, such as the theft of a vehicle, can be prevented.

An explanation will now be given for an engine start system employing a remote start control apparatus according to a fifth embodiment and a start control apparatus according to a sixth embodiment. Since the engine start system has the same configuration as that shown in FIG. 12, except for the remote start control apparatus 71, the microcomputer 72 of the apparatus 72, the immobilizer unit 61 and the microcomputer 62 of the unit 61, different reference numerals are provided for a remote start control apparatus, an immobilizer unit and microcomputers, and no explanation for other, corresponding components will be given.

Furthermore, since the processing (7)-1 (a main routine, the processing (7)-1a (an engine start process) and the processing (7)-3 (a code deletion notification process) performed by a microcomputer 72A of a remote start control apparatus 71A for the fifth embodiment are the same as the processing (1)-1 ((5)-1) in FIG. 2, the processing (1)-1a ((5)-1a) in FIG. 3 and the processing (5)-3 in FIG. 15, no further explanation for them will be given.

In addition, since the processing (8) (a main routine) performed by a microcomputer 62A of the start control apparatus (the immobilizer unit 61A) for the sixth embodiment and the processing performed by the microcomputer (not shown) of a security unit 51 are the same as the processing (6) in FIG. 13 and the processing (2) in FIG. 4, no further explanation for them will be given.

Figure 17:
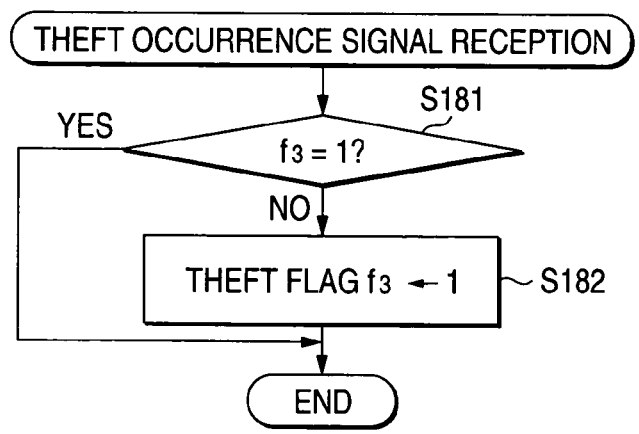
FIG. 17 is a flowchart showing the processing performed by a microcomputer in a remote start control apparatus according to a fifth embodiment of the invention.

The processing (7)-2 performed by the microcomputer 72A of the remote start control apparatus 71A for the fifth embodiment will now be explained while referring to the flowchart in FIG. 17. The processing (7)-2 is initiated when a theft occurrence signal (see step S53 in FIG. 5) is received from the security unit 51.

Upon receiving the theft occurrence signal from the security unit 51, first, a check is performed to determine whether a theft flag $f_3$ is set to "1", indicating the occurrence of a theft (step S181). When it is determined that the theft flag $f_3$ is not set to "1", the theft flag $f_3$ is set to "1" (step S182).

When it is determined that the theft flag $f_3$ is set to "1", the process at step S182 is not required, and the processing (7)-2 is terminated.

Figure 18:
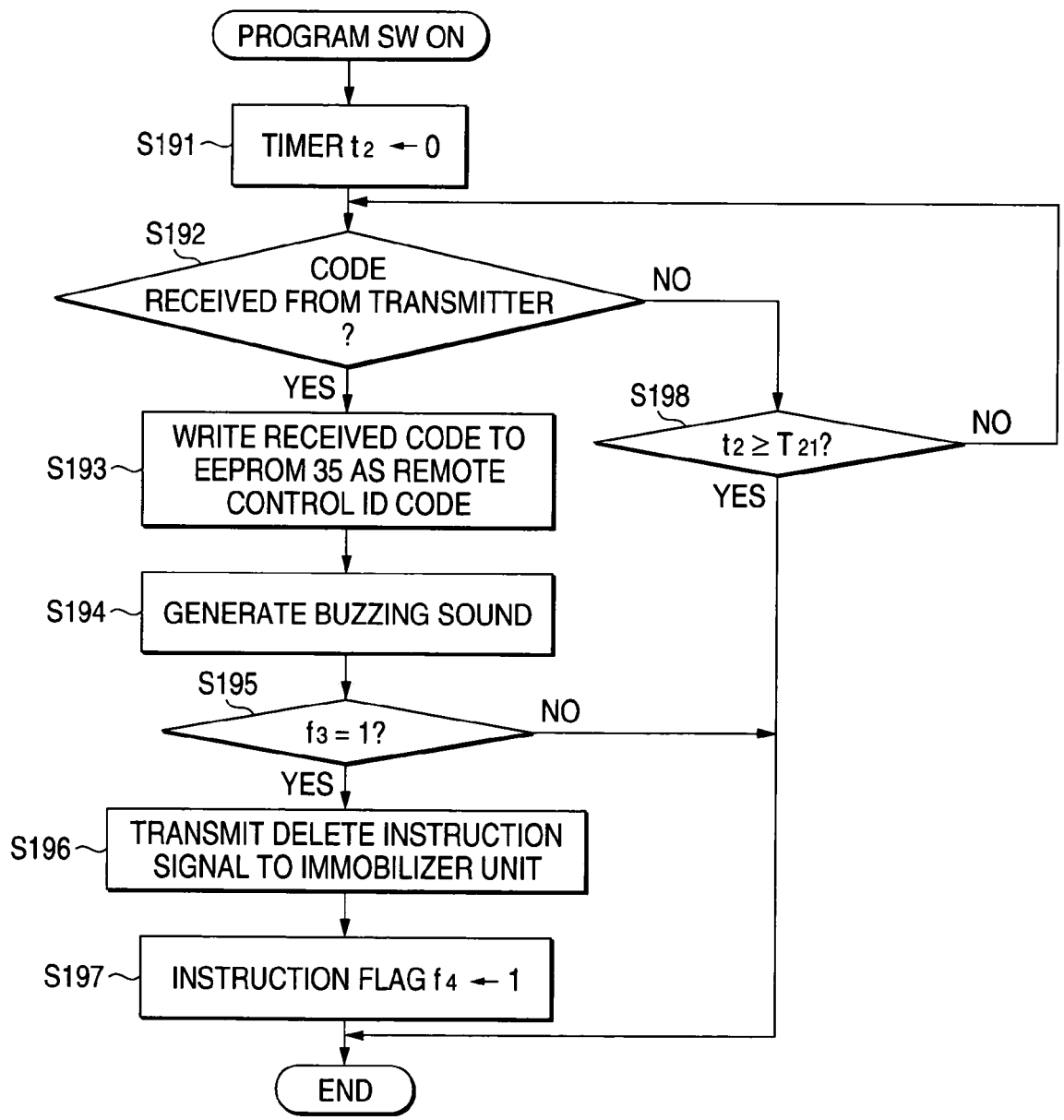
FIG. 18 is a flowchart showing the processing performed by the microcomputer in the remote start control apparatus according to the fifth embodiment.

Next, the processing (7)-4 performed by the microcomputer 72 of the remote start control apparatus 71A for the fifth embodiment will be described while referring to the flowchart in FIG. 18. The processing (7)-4 is initiated when the depression of the program switch 37 is detected, and during this processing, a remote control ID code registered in the portable transmitter 41 is written to the EEPROM 35.

When the program switch 37 is depressed, first, the timer $t_2$ is started by resetting it to "0" (step S191), and a check is performed to determine whether a signal has been received from the portable transmitter 41 via the antenna 33 and the reception unit 34 (step S192).

When it is determined that a signal has been received from the portable transmitter 41, a remote control ID code included in the received signal is written in the EEPROM 35 to register the remote control ID code (step S193). Then, the buzzer generator 38 is permitted to generate a buzzing sound and notify a driver that the registration of the remote control ID code has been completed (step S194).

Following this, a check is performed to determine whether the theft flag $f_3$ is set to "1" (step S195). When it is determined that the theft flag $f_3$ is set to "1", i.e., the remote control ID code was registered while the theft occurred, it is assumed that this registration was performed by a criminal, and a delete instruction signal is transmitted to the immobilizer unit 61A to instruct the deletion of a code stored in the EEPROM 64 of the immobilizer unit 61 (step S196). Thereafter, the instruction flag $f_4$ is set to "1", indicating that the delete instruction signal has been transmitted (step S197). When it is determined that the theft flag $f_3$ is not set to "1", the processing (7)-4 is terminated.

When it is determined at step S172 that a signal has not been received from the portable transmitter 41, a check is performed to determine whether, according to the timer $t_2$, the predetermined period $T_{21}$ (e.g., 30 seconds) has elapsed (step S198). When it is determined, according to the timer $t_2$, that the predetermined period $T_{21}$ has elapsed, the processing (7)-4 is terminated. But when it is determined, according to the timer $t_2$, that the predetermined period $T_{21}$ has not elapsed, program control returns to step S192, where the reception of the signal is waited for.

When the immobilizer unit 61A receives the delete instruction signal, the immobilizer unit 61A deletes, from the EEPROM 64, a code (e.g., a code that is supposed to match a specific code stored in the EEPROM 36 of the remote start control apparatus 71A). In this embodiment, the code stored in the EEPROM 64 is deleted; however, as one modification, the code may be rewritten to obtain different code.

According to the remote start control apparatus 71A of the fifth embodiment, when an engine start instruction is received from the portable transmitter 41, the code stored in the EEPROM 36 is transmitted to the immobilizer unit 61A. Therefore, when an engine start instruction is issued by employing a remote operation using the portable transmitter 41, a specific code is supplied to the immobilizer unit 61A in the same manner as when the authorized ignition key 1 is inserted into the key cylinder 4.

Therefore, when the code that matches a specific code in the EEPROM 36 is stored in the immobilizer unit 61A, the specific code can be transmitted to the immobilizer unit 61A upon the reception of an engine start instruction from the portable transmitter 41, and the starting of the engine can be permitted by the immobilizer unit 61A. Therefore, the engine can be started by employing the remote operation, without the authorized ignition key 1 being inserted into the key cylinder 4 and turned.

Further, according to the remote start control apparatus 71A of the fifth embodiment, when it is determined that a code (a remote control ID code) is registered in the EEPROM 35, the delete instruction signal is supplied to the immobilizer unit 61A to delete the code in the EEPROM 64 of the immobilizer unit 61A.

Furthermore, according to the start control apparatus (the immobilizer unit 61A) of the sixth embodiment, the code stored in the EEPROM 64 is deleted upon the reception of the delete instruction signal. Therefore, when the remote start control apparatus 71 is stolen by a theft who broke into the vehicle, and the specific code is obtained by analyzing the data stored in the apparatus 71, the specific code becomes meaningless at the occurrence of the theft. Thus, when the remote start control apparatus 71A itself is stolen, greater damage, such as the theft of the vehicle, can be prevented.

In addition, according to the first to the third and the fifth embodiment, the remote start control apparatus is provided separately from the security unit 51; however, as one modification, the remote start control apparatus may be integrally formed with the security unit 51. Moreover, according to the fourth and sixth embodiment, the start control apparatus (immobilizer unit) is provided separately from the engine controller 7; however, as one modification, the start control apparatus may be integrally formed with a machinery controller, such as the engine controller 7.

What is claimed is:

1. A remote start control apparatus, which is installed in a vehicle equipped with a start control apparatus, for fetching a predetermined code that is output based on a predetermined operation, for determining whether the predetermined code is a code unique to a vehicle and for, when the codes match, permitting the starting of machinery and which starts the machinery in accordance with an instruction signal received from a transmitter, comprising:

a first storage unit for storing the code unique to the vehicle;

a first supply unit for, upon receiving from the transmitter a start instruction signal for the machinery, supplying the code stored in the first storage unit to the start control apparatus; and a first memory control unit for, when a determination is made, based on a specific signal received from a theft detection unit for detecting a vehicle theft or another signal equivalent to the specific signal, that the vehicle has been stolen, either deleting the code stored in the first storage unit or rewriting the code.

2. A remote start control apparatus according to claim 1, further comprising:

a second memory control unit for, when a second predetermined condition is established, storing in the first storage unit the predetermined code that is output through the predetermined operation.

3. A remote start control apparatus according to claim 2, further comprising:

a determination unit for determining whether the predetermined code output through the predetermined operation is an appropriate code for storage in the first storage unit, wherein, when the determination unit determines that the predetermined code is an appropriate code for storage in the first storage unit, the second memory control unit stores the predetermined code in the first storage unit.

4. A remote start control apparatus according to claim 3, wherein the determination unit employs the state of the machinery to perform a determination.

5. A remote start control apparatus according to claim 1, further comprising:

a notification unit for issuing a notification that the code stored in the first storage unit has been deleted or rewritten.

6. A remote start control apparatus according to claim 5, wherein the notification unit issues a notification at a predetermined time.

7. A remote start control apparatus, which is installed in a vehicle equipped with a start control apparatus, for fetching a predetermined code that is output based on a predetermined operation, for determining whether the predetermined code is a code unique to a vehicle and for, when the codes match, permitting the starting of machinery and which starts the machinery in accordance with an instruction signal received from a transmitter, comprising:
- a first storage unit for storing the code unique to the vehicle;
- a first supply unit for, upon receiving from the transmitter a start instruction signal for the machinery, supplying the code stored in the first storage unit to the start control apparatus; and
- a memory control unit for, when the disconnection of a battery mounted in the vehicle is detected, deleting or rewriting the code stored in the first storage unit.

8. A remote start control apparatus, which is installed in a vehicle equipped with a start control apparatus, for fetching a predetermined code that is output based on a predetermined operation, for determining whether the predetermined code is a code unique to a vehicle and for, when the codes match, permitting the starting of machinery and which starts the machinery in accordance with an instruction signal received from a transmitter, comprising:
- a first storage unit for storing the code unique to the vehicle;
- a first supply unit for, upon receiving from the transmitter a start instruction signal for the machinery, supplying the code stored in the first storage unit to the start control apparatus;
- a second storage unit for storing a remote control ID code used for a remote operation; and
- a memory control unit for, when it is determined that a remote control ID code has been registered in the second storage unit, deleting or rewriting the code stored in the first storage unit.

9. A remote start control apparatus according to claim 8, wherein, when for the remote start control apparatus of the third aspect it is determined that a code has been registered in the second storage unit, while a first predetermined condition, such as the theft of the vehicle, has been established, the memory control unit deletes or rewrites the code stored in the first storage unit.

10. A remote start control apparatus, which is installed in a vehicle that is equipped with a start control apparatus, for fetching a predetermined code that is output based on a predetermined operation and determining whether the predetermined code matches one of a plurality of unique vehicle codes and for, when the predetermined code matches one of the unique vehicle codes, permitting machinery to be started and starting the machinery in accordance with an instruction signal received from a transmitter, comprising:
- a storage unit for storing a specific code that matches one of the unique vehicle codes stored in the start control apparatus;
- a first supply unit for, upon receiving a start instruction signal for the machinery from the transmitter, supplying to the start control apparatus the specific code stored in the third storage unit; and
- a second supply unit for, when a determination is made, based on a detection signal, or another signal equivalent to the detection signal, received by a detection unit for detecting vehicle theft, that a vehicle theft has occurred, supplying a delete/rewrite instruction signal to the start control apparatus to initiate the deleting or rewriting of the unique vehicle code that is stored in the start control apparatus and that matches the specific code.

11. A remote start control apparatus, which is installed in a vehicle that is equipped with a start control apparatus, for fetching a predetermined code that is output based on a predetermined operation and determining whether the predetermined code matches one of a plurality of unique vehicle codes and for, when the predetermined code matches one of the unique vehicle codes, permitting machinery to be started and starting the machinery in accordance with an instruction signal received from a transmitter, comprising:
- a first storage unit for storing a specific code that matches one of the unique vehicle codes stored in the start control apparatus;
- a first supply unit for, upon receiving a start instruction signal for the machinery from the transmitter, supplying to the start control apparatus the specific code stored in the third storage unit;
- a second storage unit for storing a remote control ID code used for a remote operation; and
- a second supply unit for, when it is determined that a code has been registered in the second storage unit, transmitting a delete/rewrite instruction signal to the start control apparatus to initiate the deleting or rewriting of a unique vehicle code that is stored in the start control apparatus and that matches the specific code.

12. A remote start control apparatus according to claim 11, wherein, when it is determined that the registration of a code in the second storage unit has been performed, while a first predetermined condition has been established, the second supply unit transmits the delete/rewrite instruction signal to the start control apparatus.

13. A start control apparatus, which permits the starting of machinery when it is determined that one of a plurality of unique vehicle codes stored in a storage unit matches a specific code that is supplied by a remote start control apparatus for starting the machinery in accordance with a predetermined code received through a predetermined operation, or an instruction signal received from a transmitter, comprising:
- a memory controller for, when a determination is made, based on a detection signal received by a theft detection unit for detecting a vehicle theft, or another signal equivalent to the detection signal, that a vehicle theft has occurred, deleting or rewriting one of the unique vehicle codes that is stored in the storage unit and that matches the specific code.

14. A start control apparatus, which permits the starting of machinery when it is determined that one of a plurality of unique vehicle codes stored in a storage unit matches a specific code that is supplied by a remote start control apparatus for starting the machinery in accordance with a predetermined code received through a predetermined operation, or an instruction signal received from a transmitter, comprising:
- a memory control unit for, upon receiving a delete/rewrite instruction signal from the remote start control apparatus to delete or rewrite a unique vehicle code that matches the specific code, deleting or rewriting the unique vehicle code that is stored in the storage unit and that matches the specific code.

* * * * *